United States Patent
Ishii et al.

(10) Patent No.: US 10,351,089 B2
(45) Date of Patent: Jul. 16, 2019

(54) SUPPORT STRUCTURE FOR AIRBAG APPARATUS

(71) Applicant: TOYODA GOSEI CO., LTD., Kiyosu-shi, Aichi-ken (JP)

(72) Inventors: Tsutomu Ishii, Kiyosu (JP); Toshihito Yanagisawa, Kiyosu (JP); Mikine Hayashi, Kiyosu (JP); Yuji Sato, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 183 days.

(21) Appl. No.: 15/658,766

(22) Filed: Jul. 25, 2017

(65) Prior Publication Data

US 2018/0029556 A1 Feb. 1, 2018

(30) Foreign Application Priority Data

Jul. 29, 2016 (JP) .................................. 2016-149729
Feb. 23, 2017 (JP) ................................. 2017-032512

(51) Int. Cl.
*B60R 21/203* (2006.01)
*B60R 21/00* (2006.01)

(52) U.S. Cl.
CPC .. *B60R 21/2037* (2013.01); *B60R 2021/0004* (2013.01); *B60R 2021/0032* (2013.01)

(58) Field of Classification Search
CPC ........ B60R 21/2037; B60R 2021/0004; B60R 2021/0032
See application file for complete search history.

(56) References Cited

U.S. PATENT DOCUMENTS

| 2007/0228703 | A1* | 10/2007 | Breed ................ | B60N 2/0232 280/735 |
| 2009/0218739 | A1* | 9/2009 | Terada ............... | B60R 21/2037 267/2 |
| 2010/0219621 | A1* | 9/2010 | Sasaki ................ | B60Q 5/003 280/731 |
| 2012/0080868 | A1* | 4/2012 | Banno ................ | B60R 21/2037 280/728.2 |
| 2013/0076011 | A1* | 3/2013 | Umemura ........... | B62D 7/222 280/728.2 |

(Continued)

FOREIGN PATENT DOCUMENTS

JP 2016-030552 A 3/2016

*Primary Examiner* — Darlene P Condra
(74) *Attorney, Agent, or Firm* — Posz Law Group, PLC

(57) ABSTRACT

A support structure for an airbag apparatus includes an airbag apparatus having a bag holder, a pin, a pin holder, a damper holder, an elastic member, a motion transmitting portion, a motion receiving portion, and a noise suppressing portion. The pin includes a shaft portion passed through a mounting hole provided in the bag holder and a flange portion formed at the rear end of the shaft portion. The pin holder slidably covers the shaft portion. The damper holder is mounted to the airbag apparatus while covering the pin holder. The elastic member includes an elastic body portion. A gap is provided inside the motion transmitting portion. The noise suppressing portion is located between the gap and the pin holder, is made of a material softer than the pin holder, and has an inner diameter smaller than the inner diameter of the elastic body portion.

18 Claims, 10 Drawing Sheets

(56) References Cited

U.S. PATENT DOCUMENTS

2013/0239739 A1* 9/2013 Miyahara ............ B60R 21/2037
74/552
2014/0131982 A1* 5/2014 Ishii .................... B60R 21/2037
280/728.2
2016/0031480 A1* 2/2016 Ishii ...................... B60Q 5/003
280/731

* cited by examiner

SUPPORT STRUCTURE FOR AIRBAG APPARATUS

BACKGROUND OF THE INVENTION

The present invention relates to a support structure for an airbag apparatus that allows an airbag apparatus to be supported by the steering wheel in a vehicle such as an automobile.

For example, Japanese Laid-Open Patent Publication No. 2016-30552 discloses a structure in which, as shown in FIG. 17, an airbag apparatus 50 is used as the damper mass of a dynamic damper, and the airbag apparatus 50 is supported by a steering wheel 52. This support structure includes a pin 53, a pin holder 54, a damper holder 55, and an elastic member 56.

The pin 53 has a shaft portion 53a extending in the front-rear direction. The shaft portion 53a is passed through a mounting hole 51a of a bag holder 51 of the airbag apparatus 50. The shaft portion 53a has at the rear end a flange portion 53b having an outer diameter greater than the inner diameter of the mounting hole 51a. The pin 53 is attached to the steering wheel 52 by a snap-fit structure at the front end of the shaft portion 53a and supports the airbag apparatus 50 at the rear of the shaft portion 53a. The pin holder 54 slidably covers the shaft portion 53a in a state of being passed through the mounting hole 51a and is urged rearward by an urging member 57. The damper holder 55 includes an annular plate-shaped bottom wall portion 55a and a cylindrical circumferential wall portion 55b extending rearward from the outer circumferential portion of the bottom wall portion 55a. The damper holder 55 is mounted to the airbag apparatus 50 while covering part of the pin holder 54. The elastic member 56 includes an elastic body portion 56a and an annular protrusion 56b. The elastic body portion 56a is annular and is arranged between the pin holder 54 and the damper holder 55. The annular protrusion 56b is provided on the outer circumferential portion of the rear end of the elastic body portion 56a. The annular protrusion 56b is in contact with the rear end face of the circumferential wall portion 55b of the damper holder 55.

A motion transmitting portion 55c is provided on the inner circumferential portion of the bottom wall portion 55a. The motion transmitting portion 55c extends forward and is passed through the mounting hole 51a. A motion receiving portion 54a protrudes from part of the outer circumferential surface of the pin holder 54 that is immediately forward of the motion transmitting portion 55c. The motion transmitting portion 55c and the motion receiving portion 54a are configured to transmit forward motion of the damper holder 55 to the pin holder 54.

A gap G1 exists inside the motion transmitting portion 55c. A tubular noise suppressing portion 56c, which is made of a material softer than the pin holder 54, is provided inside the gap G1. The noise suppressing portion 56c extends forward from the inner circumferential portion of the elastic body portion 56a and constitutes part of the elastic member 56.

In the above described support structure, the airbag apparatus 50 functions as the damper mass of a dynamic damper, and the elastic body portion 56a functions as the spring of the dynamic damper. That is, when the steering wheel 52 vibrates, the elastic body portion 56a vibrates together with the airbag apparatus 50 while being elastically deformed at a resonance frequency that is the same as or close to the frequency of the vibration, so that the elastic body portion 56a absorbs the vibration energy of the steering wheel 52. Due to such energy absorption, the vibration of the steering wheel 52 is suppressed.

When the airbag is inflated rearward at the activation of the airbag apparatus 50, rearward force is applied to the bag holder 51. The flange portion 53b of the pin 53 functions as a stopper by being positioned behind the peripheral portion of the mounting hole 51a of the bag holder 51, which moves rearward. The flange portion 53b restrains the bag holder 51 and thus the airbag apparatus 50 from coming off the pin 53.

Furthermore, when the vibration of the steering wheel 52 is transmitted to the airbag apparatus 50, the noise suppressing portion 56c restrains the hard motion transmitting portion 55c and the hard pin holder 54 from directly contacting each other, thereby preventing generation of noise due to contact between the motion transmitting portion 55c and the pin holder 54.

In order to prevent the bag holder 51 from coming off the pin 53 as described above, the difference between the inner diameter of the mounting hole 51a and the outer diameter of the flange portion 53b is preferably increased by reducing the inner diameter of the mounting hole 51a. This is because such reduction in the inner diameter of the mounting hole 51a will increase the region in the flange portion 53b that restricts the rearward motion of the bag holder 51.

In addition to the shaft portion 53a of the pin 53, Japanese Laid-Open Patent Publication No. 2016-30552 passes, through the mounting hole 51a, the pin holder 54, the motion transmitting portion 55c of the damper holder 55, the gap G1, and the noise suppressing portion 56c of the elastic member 56. Therefore, the inner diameter of the mounting hole 51a is affected by the shaft portion 53a, the pin holder 54, the motion transmitting portion 55c, the gap G1, and the noise suppressing portion 56c.

In this regard, the noise suppressing portion 56c of Japanese Laid-Open Patent Publication No. 2016-30552 simply extends forward from the inner circumferential portion of the elastic body portion 56a, which functions as the spring of the dynamic damper. The noise suppressing portion 56c is thus one factor that independently increases the inner diameter of the mounting hole 51a. Therefore, there is still room for improvement in preventing the bag holder 51 from coming off the pin 53 by reducing the inner diameter of the mounting hole 51a.

SUMMARY OF THE INVENTION

It is an objective of the present invention to provide a support structure for an airbag apparatus that is capable of improving the performance in restraining a bag holder from coming off a pin.

To achieve the foregoing objective and in accordance with one aspect of the present invention, a support structure for an airbag apparatus is provided that includes an airbag apparatus, a pin, a pin holder, a damper, an elastic member, a motion transmitting portion, and a motion receiving portion. The airbag apparatus functions as a damper mass of a dynamic damper and includes a bag holder. The pin includes a shaft portion and a flange portion. The shaft portion extends in a front-rear direction and is passed through a mounting hole provided in the bag holder. The flange portion is formed at a rear end of the shaft portion and is unable to be passed through the mounting hole. The pin is mounted to a steering wheel at a front end of the shaft portion and supports the airbag apparatus at a rear portion of the shaft portion. The pin holder slidably covers the shaft portion while being passed through the mounting hole. The damper holder is mounted to the airbag apparatus while covering the pin holder. The elastic member includes an annular elastic body portion. The annular elastic body portion is arranged between the pin holder and the damper holder and functions as a spring of the dynamic damper. The motion transmitting portion is provided in an inner circumferential portion of the damper holder and passed through the mounting hole. The motion receiving portion protrudes from an outer circumferential surface of the pin holder. A forward motion of the damper holder is transmitted to the pin holder at least via the motion transmitting portion and the motion receiving portion. The gap is provided inside the motion transmitting portion. The support structure further includes a noise suppressing portion that is located between the gap and the pin holder. The noise suppressing portion is made of a material softer than the pin holder and has an inner diameter smaller than an inner diameter of the elastic body portion.

BRIEF DESCRIPTION OF THE DRAWINGS

FIG. 16 is a cross-sectional side view showing a state before the pin holder and the like are assembled to the damper holder and the like.

DETAILED DESCRIPTION OF THE PREFERRED EMBODIMENTS

First Embodiment

A structure for supporting an airbag apparatus 20 on an automobile steering wheel 10 according to a first embodiment will now be described with reference to FIGS. 1 to 12.

Figure 1A:
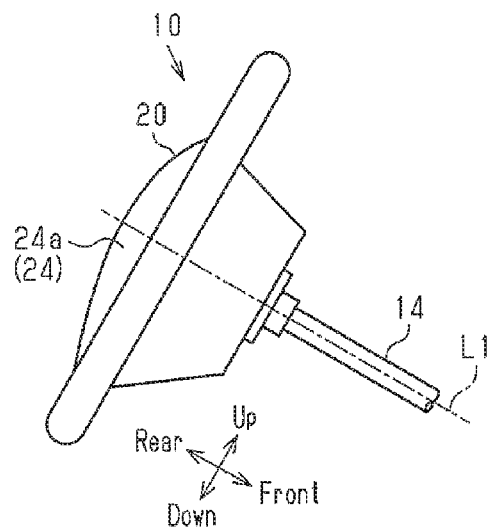
FIG. 1A is a side view of a steering wheel equipped with an airbag apparatus according to a first embodiment.

As shown in FIG. 1A, the automobile is provided with a steering shaft 14, which turns around an axis L1 inclined so as to be higher toward the rear end. A steering wheel 10 is mounted to the rear end of the steering shaft 14.

In the present description, the axis L1 is used as a reference when describing each part of the steering wheel 10. The direction along the axis L1 will be referred to as a front-rear direction. Among directions along the plane perpendicular to the axis L1, the direction in which the steering wheel 10 is erected will be referred to as an up-down direction. Therefore, the front-rear direction and the up-down direction of the steering wheel 10 are inclined relative to the front-rear direction (horizontal direction) and the up-down direction (vertical direction) of the automobile.

Figure 17:
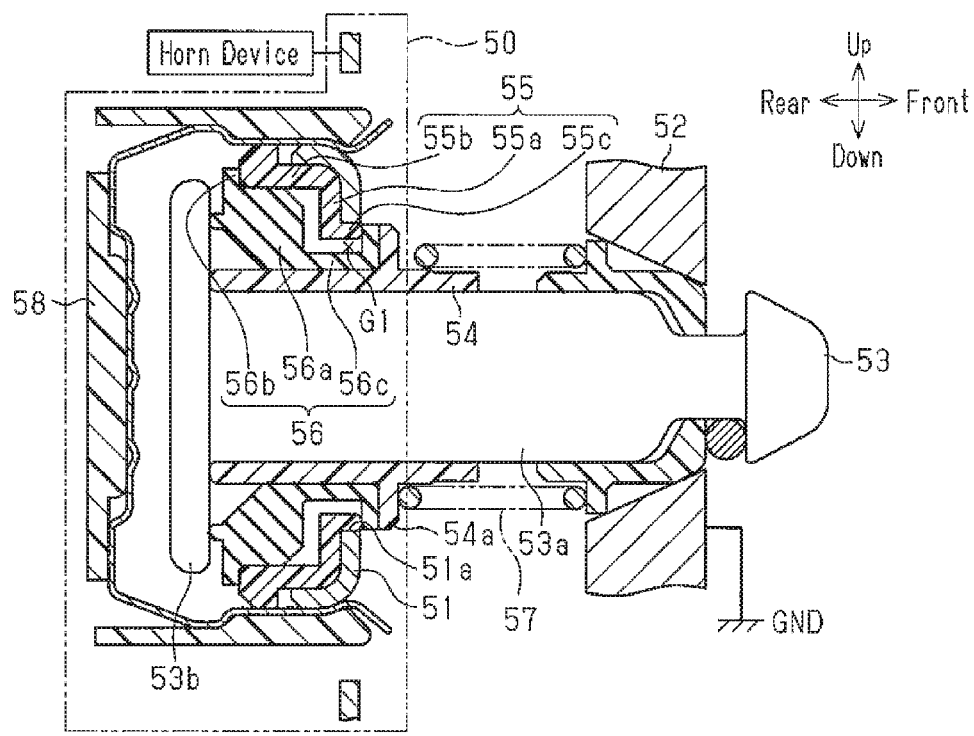
FIG. 17 is a partial cross-sectional side view showing a conventional support structure for an airbag apparatus.

In FIGS. 2 to 9, 11, and 12, for purposes of illustration, the front-rear direction of the steering wheel 10 coincides with the horizontal direction, and the up-down direction of the steering wheel 10 coincides with the vertical direction. The same applies to FIGS. 13 to 16 illustrating a second embodiment and FIG. 17 illustrating a conventional structure.

Figure 1B:
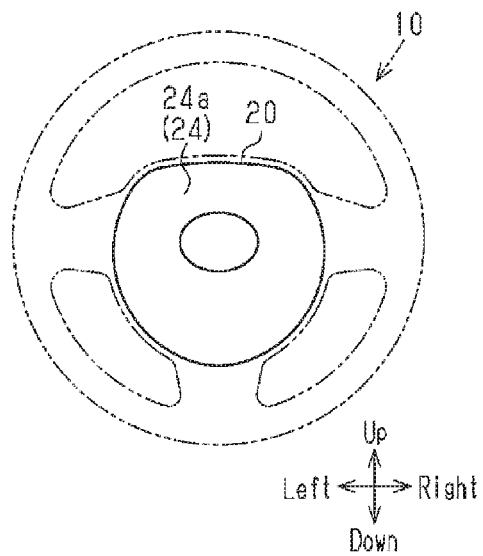
FIG. 1B is a front view of the steering wheel equipped with the airbag apparatus.
Figure 6:
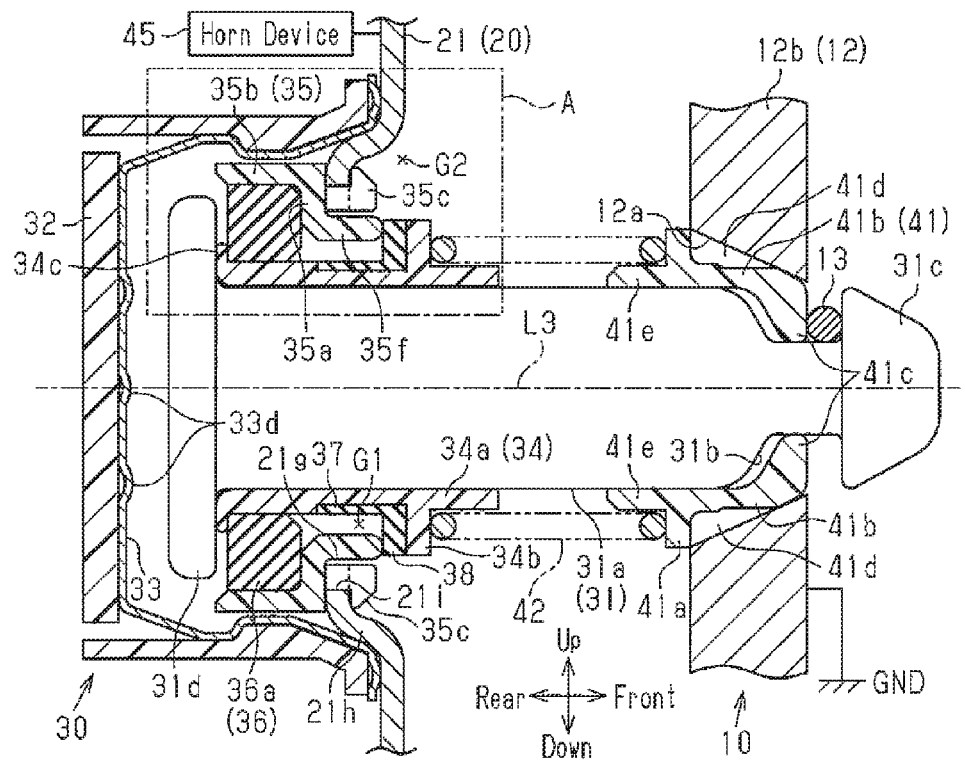
FIG. 6 is a partial cross-sectional side view showing the horn switch mechanism and its surroundings when the airbag apparatus of the first embodiment is not pushed down.
Figure 7:
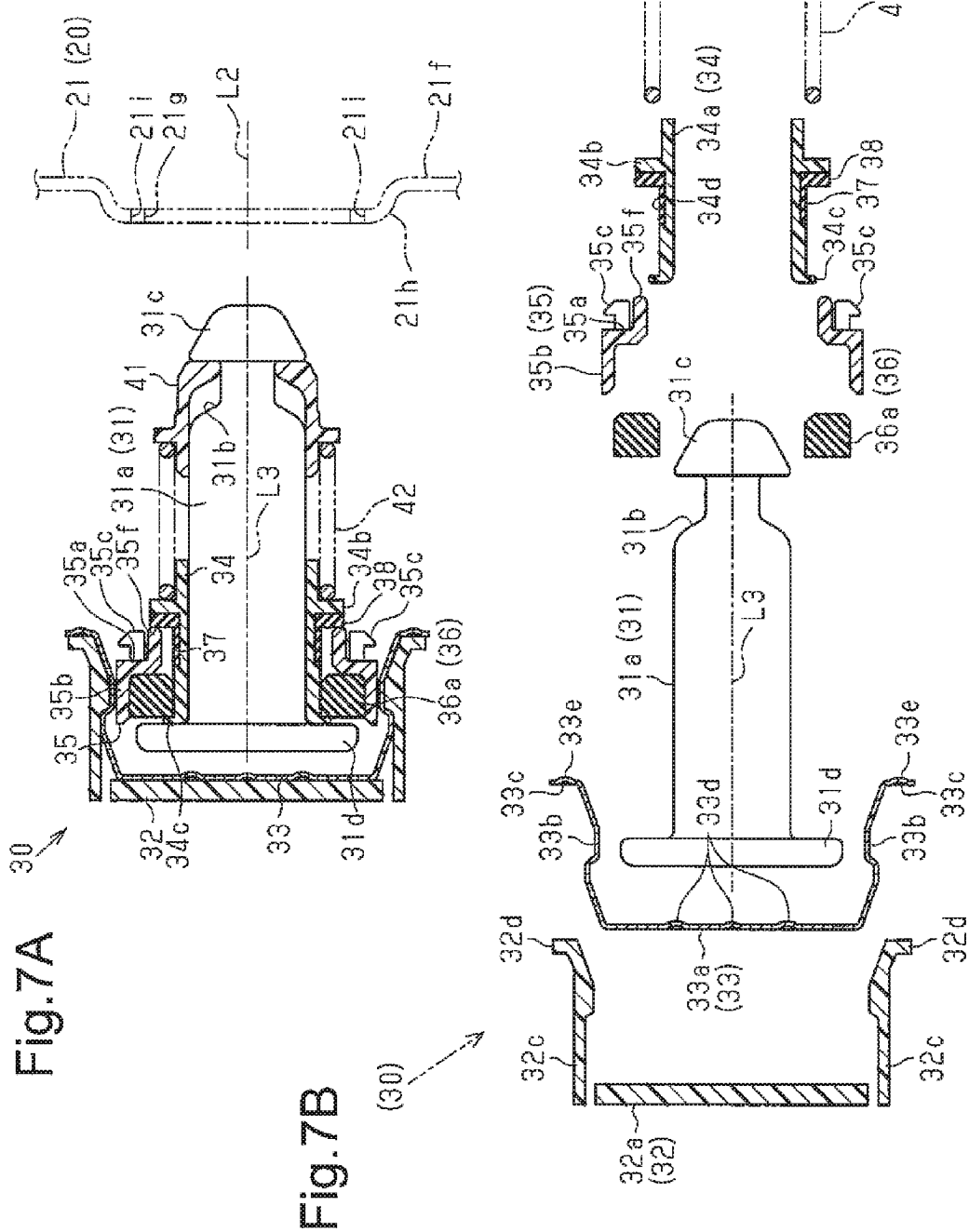
FIG. 7A is a cross-sectional side view showing the relationship between the horn switch mechanism and the bag holder of the first embodiment.
FIG. 7B is an exploded cross-sectional view showing the components of the horn switch mechanism.

As shown in FIGS. 1A, 1B, and 6, the steering wheel 10 includes the airbag apparatus (airbag module) 20 at the center. The framework of the steering wheel 10 is constituted by a metal core 12. The metal core 12 is made of iron, aluminum, magnesium, or an alloy thereof. The metal core 12 is mounted to the steering shaft 14 at its central portion, and rotates integrally with the steering shaft 14.

The metal core 12 includes holding portions 12b at positions surrounding the center. Each holding portion 12b has a through-hole 12a. The inner wall surface of each through-hole 12a is tapered such that the inner diameter of the through-hole 12a decreases toward the front.

A clip 13 is arranged in front of each holding portion 12b. Each clip 13 is formed by bending a wire made of metal such as spring steel having conductivity into a predetermined shape. Part of each clip 13 contacts the metal core 12. Part of each clip 13 is located in front of and in the vicinity of the corresponding through-hole 12a.

The automobile has a horn device 45. Three horn switch mechanisms 30 (see FIGS. 2 and 4) are provided for activating the horn device 45 through pressing operation on the airbag apparatus 20. The horn switch mechanisms 30 have an identical structure. Each horn switch mechanism 30 is mounted to the metal core 12 by a snap-fit structure in the corresponding holding portion 12b. The airbag apparatus 20 is supported by the metal core 12 with these horn switch mechanisms 30. As described above, each horn switch mechanism 30 has a function as a support for the airbag apparatus 20 and a function of a switch for the horn device 45. Further, each horn switch mechanism 30 has a function of suppressing vibration; that is, damping vibration of the steering wheel 10 using the airbag apparatus 20.

The airbag apparatus 20 and the horn switch mechanisms 30 will now be described.

<Airbag Apparatus 20>

Figure 3:
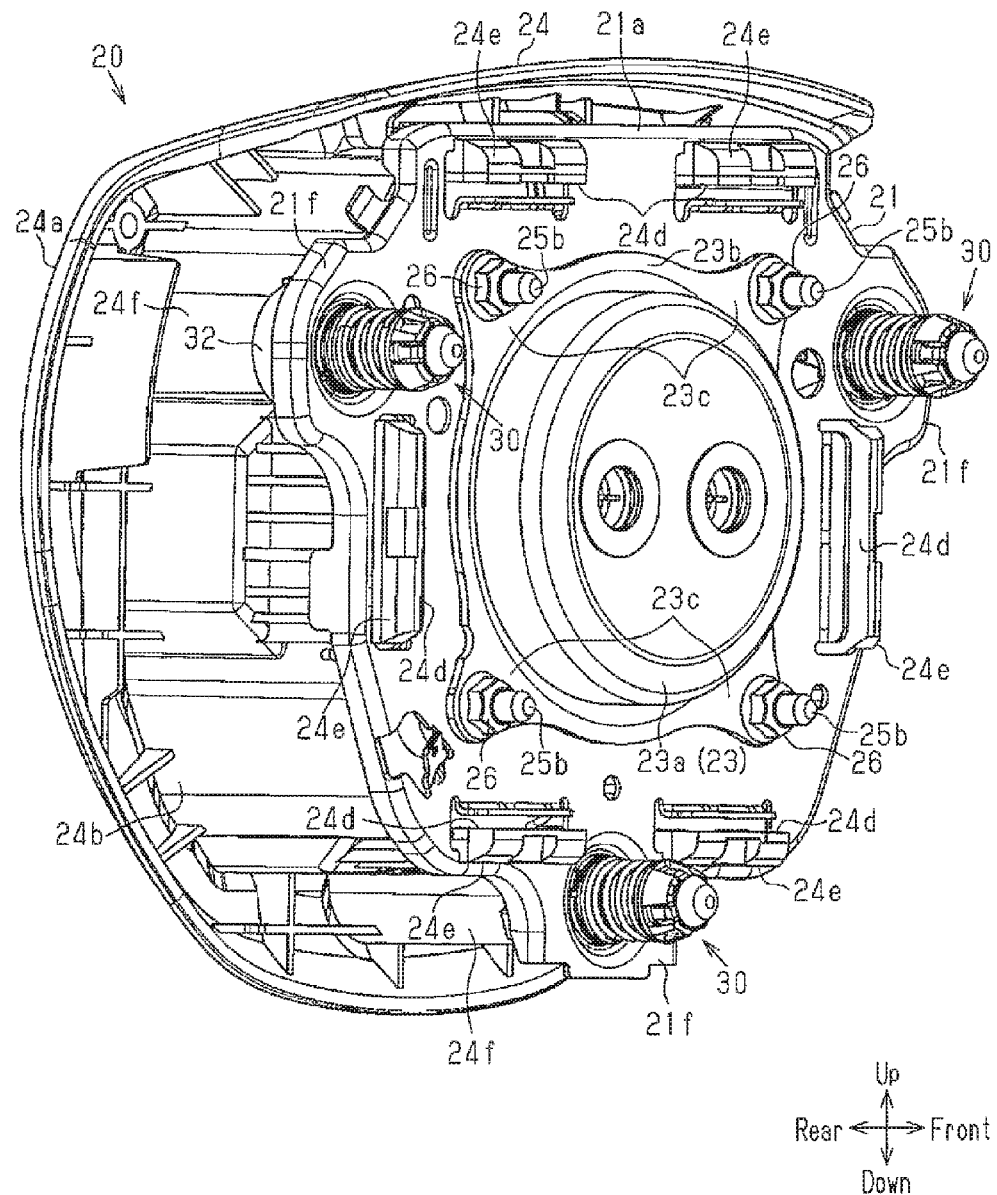
FIG. 3 is a perspective view of the airbag apparatus of the first embodiment.
Figure 4:
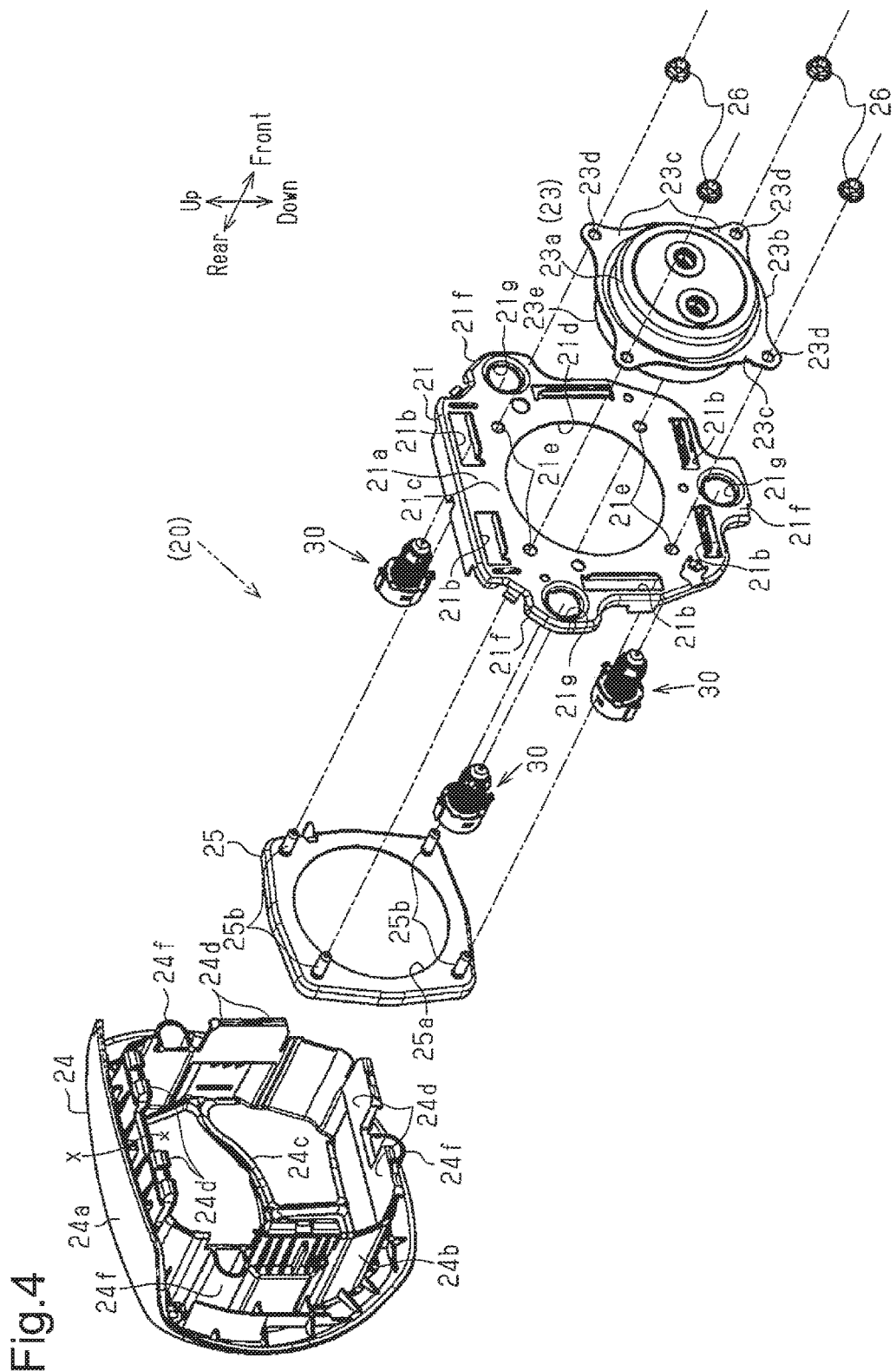
FIG. 4 is an exploded perspective view showing the components of the airbag apparatus according to the first embodiment together with the horn switch mechanisms.

As shown in FIGS. 3, 4, and 6, the airbag apparatus 20 is constituted by assembling a pad portion 24, a ring retainer 25, an airbag (not shown), and an inflator 23 to a bag holder 21.

The pad portion 24 has an outer cover 24a and a storing wall portion 24b. The surface (rear surface) of the outer cover 24a forms an ornamental surface. The storing wall portion 24b has a substantially rectangular looped shape that extends forward from the back side of the outer cover 24a. The space surrounded by the outer cover 24a, the storing wall portion 24b, and the bag holder 21 constitutes a bag storing space x for mainly storing the airbag. A thin portion 24c, which is to be pushed and broken when the airbag is inflated and deployed, is formed in a portion of the outer cover 24a defining the bag storing space x.

The storing wall portion 24b has rectangular plate-shaped locking hooks 24d at the front end. Each locking hook 24d has a locking projection 24e, which extends away from the bag storing space x.

The pad portion 24 has switch support portions 24f for supporting the horn switch mechanisms 30 from the rear. Each switch support portion 24f is integrally formed with the storing wall portion 24b to extend forward from the outer cover 24a of the pad portion 24.

The bag holder 21 is formed by pressing a metal plate having conductivity. Alternatively, the bag holder 21 may be formed by die-casting or the like using a conductive metal material. The bag holder 21 is electrically connected to the horn device 45. The peripheral portion of the bag holder 21 constitutes a peripheral fixing portion 21a, which has a substantially rectangular looped shape and is used for fixing the pad portion 24.

The peripheral fixing portion 21a has slit-shaped hook locking holes 21b at positions in front of the locking hooks 24d. The front ends of the locking hooks 24d are passed through and locked to the hook locking holes 21b.

The inner portion of the peripheral fixing portion 21a constitutes a base portion 21c. A circular opening 21d is provided at the center of the base portion 21c. The base portion 21c has screw insertion holes 21e in the vicinity of the periphery of the opening 21d. The inflator 23 is mounted to the base portion 21c with part thereof passed through the opening 21d.

More specifically, the inflator 23 has a short columnar main body 23a and a flange 23b on the outer circumferential surface of the main body 23a. Attachment tabs 23c protrude radially outward with respect to the main body 23a from the flange 23b. Each attachment tab 23c has a screw insertion hole 23d at a position in front of the corresponding screw insertion hole 21e of the bag holder 21. The inflator 23 has a gas outlet portion 23e for ejecting inflation gas at a position rearward of the flange 23b. The inflator 23 is inserted through the opening 21d of the bag holder 21 from the front side such that the gas outlet portion 23e protrudes toward the bag storing space x. The inflator 23 is mounted to the bag holder 21 together with a ring retainer 25 with the flange 23b held in contact with the periphery of the opening 21d.

More specifically, the ring retainer 25 has a circular opening 25a, which is equivalent to the opening 21d of the bag holder 21. Also, the ring retainer 25 has mounting screws 25b, each of which is located at a position behind the corresponding screw insertion hole 21e of the bag holder 21. The opening of the airbag, which is folded to be deployed and inflated, is arranged between the ring retainer 25 and the bag holder 21. The mounting screws 25b of the ring retainer 25 are inserted into screw insertion holes (not shown) provided in the periphery of the airbag opening and the screw insertion holes 21e, 23d of the bag holder 21 and the inflator 23 from the rear. Further, nuts 26 are fastened to the passed through mounting screws 25b from the front, so that the airbag is fixed to the bag holder 21 via the ring retainer 25. Also, the inflator 23 is fixed to the bag holder 21.

Figure 10:
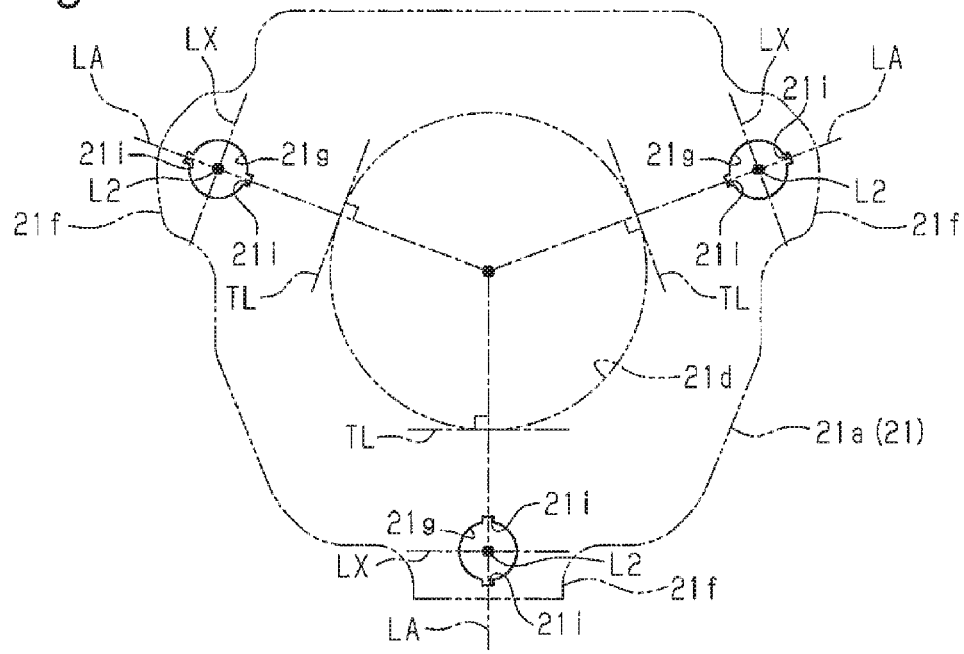
FIG. 10 is an explanatory diagram showing the positional relationship between first imaginary lines and cutout portions of the first embodiment.

As shown in FIGS. 4, 7A, and 10, the bag holder 21 includes mounting portions 21f for mounting the horn switch mechanisms 30 at corresponding positions in the peripheral fixing portion 21a. Each mounting portion 21f protrudes outward in the radial direction of the circular opening 21d. Each mounting portion 21f is located at a position in front of the corresponding switch support portion 24f of the pad portion 24. Each mounting portion 21f has a mounting hole 21g, which extends through the mounting portion 21f in the front-rear direction. An annular portion around each mounting hole 21g of the bag holder 21 bulges rearward with respect to the remaining portions. These parts are referred to as bulging portions 21h to be distinguished from the remaining portions of the bag holder 21. Each mounting hole 21g has cutout portions 21i at two positions on the inner wall surface on the opposite sides of the axis L2 of the mounting hole 21g. The cutout portions 21i serve as temporary receiving portions.

At the operation of the airbag apparatus 20, the bag holder 21 is deformed by the inflating airbag so that a portion around the opening 21d is raised. At this time, the bag holder 21 is bent along first imaginary lines LX, which pass through the mounting holes 21g in the mounting portions 21f. The cutout portions 21i in each mounting hole 21g are formed on a second imaginary line LA, which intersects with the first imaginary line LX. In the first embodiment, each second imaginary line LA is orthogonal to the corresponding first imaginary line LX. Third imaginary lines passing through the center of the opening 21d and the centers of the mounting holes 21g intersect with the inner wall surface of the opening 21d. Each first imaginary line LX is parallel or substantially parallel with the tangent line TL at this intersecting portion.

The airbag apparatus 20, which is configured as described above, is used as the damper mass of a dynamic damper.

<Horn Switch Mechanism 30>

Figure 2:
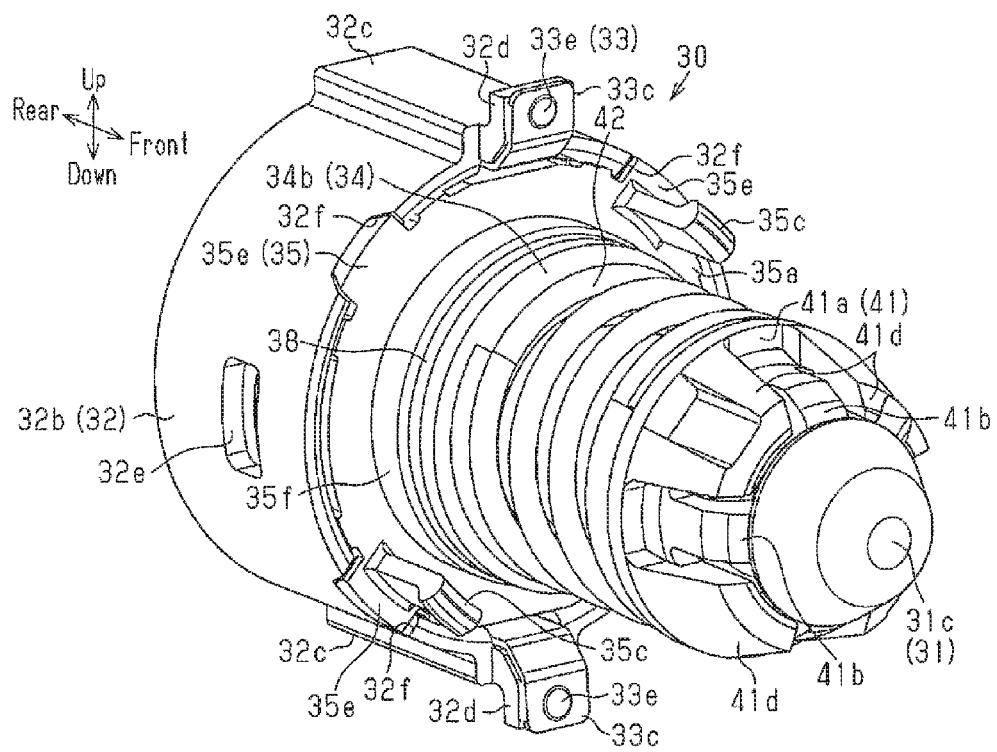
FIG. 2 is a perspective view of a horn switch mechanism of the first embodiment.
Figure 5:
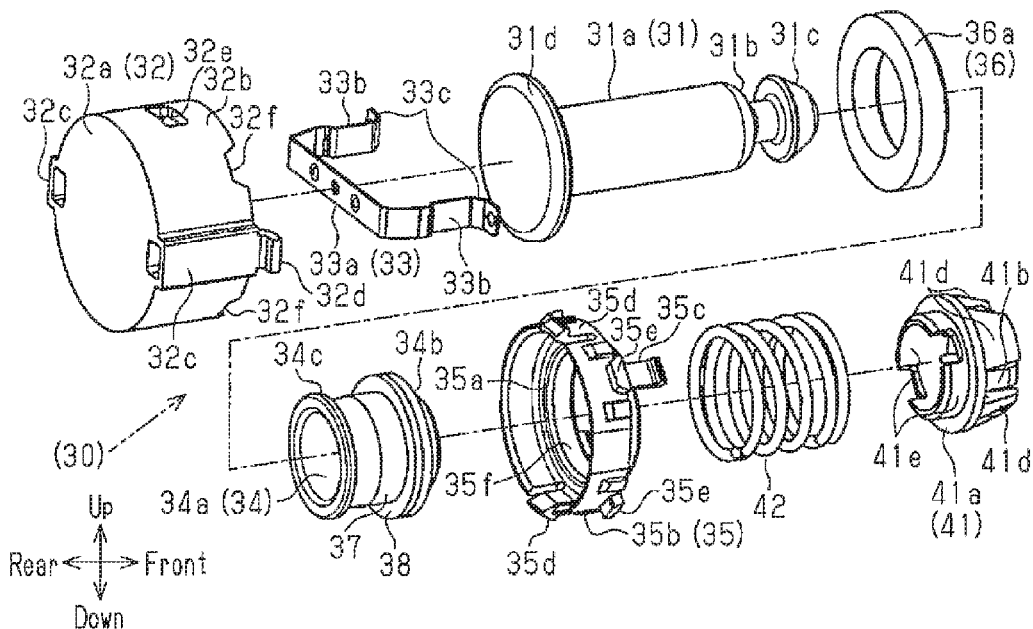
FIG. 5 is an exploded perspective view showing the components of the horn switch mechanism according to the first embodiment.

As shown in FIGS. 2, 5, and 7B, each horn switch mechanism 30 includes a pin 31, a contact holder 32, a movable contact portion 33, a pin holder 34, a damper holder 35, an elastic member 36, a noise suppressing portion 37, an elastic plate portion 38, a support assisting member 41, and an urging member. The components of the horn switch mechanism 30 will now be described.

<Pin 31>

The pin 31 is made of a conductive metal material. The structure in which the pin 31 supports the metal core 12 will be described below. The pin 31 has a shaft portion 31a extending in the front-rear direction along an axis L3, which is parallel with the axis L1 of the steering shaft 14. Most part of the shaft portion 31a excluding a flange portion 31d and a locking groove 31b, which will be discussed below, has an outer diameter smaller than the inner diameter of the mounting hole 21g of the bag holder 21. The pin 31 is passed through the mounting hole 21g at the shaft portion 31a.

The annular locking groove 31b is formed at a position slightly rearward from the front end face of the shaft portion 31a. The part of the shaft portion 31a between the front end face and the locking groove 31b constitutes a support portion 31c of the shaft portion 31a.

The flange portion 31d is formed at the outer circumferential portion of the rear end of the shaft portion 31a and has an outer diameter greater than that of the remaining portion of the shaft portion 31a. The outer diameter of the flange portion 31d is set greater than the inner diameter of the mounting hole 21g.

The rear end of the pin 31, that is, the rear end of the shaft portion 31a and the flange portion 31d, constitutes a fixed contact portion.

<Contact Holder 32>

Figure 8:
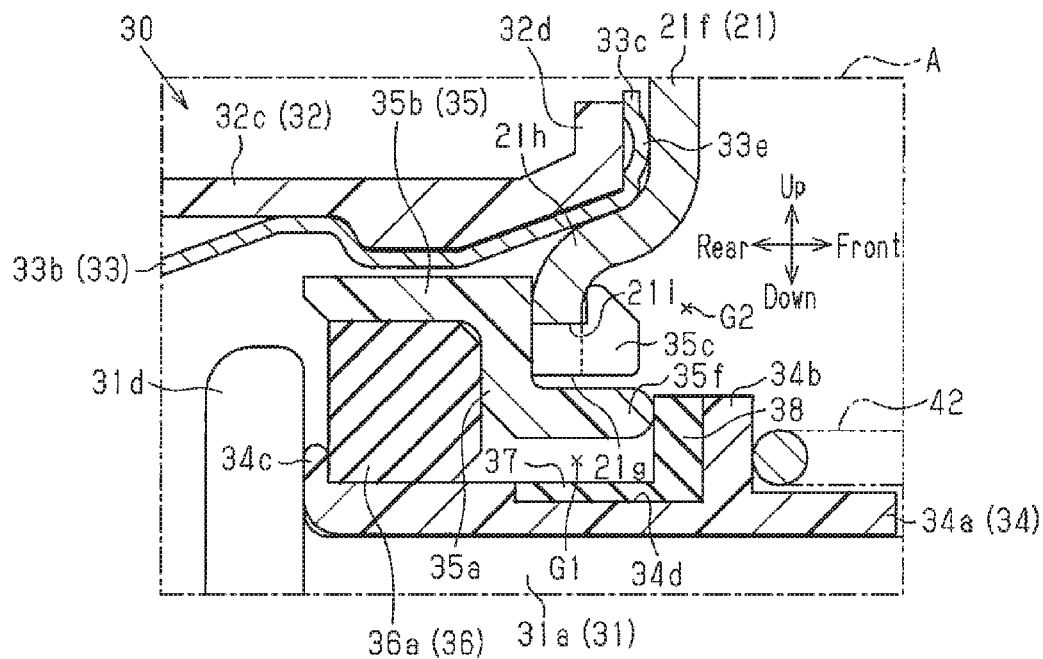
FIG. 8 is an enlarged partial cross-sectional side view illustrating section A in FIG. 6.

As shown in FIGS. 5, 7B, and 8, the contact holder 32 is made of a hard plastic having an insulation property. The contact holder 32 includes a substantially disk-shaped top plate portion 32a and a substantially cylindrical circumferential wall portion 32b. The circumferential wall portion 32b extends forward from the outer circumferential portion of the top plate portion 32a. The contact holder 32 covers the rear portion of the pin 31 that includes the flange portion 31d.

The circumferential wall portion 32b has accommodating portions 32c at two positions opposed to each other in the radial direction with the axis L3 in between. The accommodating portions 32c extend in the front-rear direction. A pressing piece 32d is formed at the front end of each accommodating portion 32c. The pressing piece 32d protrudes outward in the radial direction of the circumferential wall portion 32b.

The circumferential wall portion 32b has a hook engaging hole 32e (see FIG. 2) at a position between the two accommodating portions 32c. The hook engaging hole 32e is located at an intermediate portion in the front-rear direction of the circumferential wall portion 32b. Further, the circumferential wall portion 32b has cutout portions 32f (see FIG. 2) at positions between the two accommodating portions 32c at the front end.

<Movable Contact Portion 33>

The movable contact portion 33 is formed by pressing a band-shaped spring steel having conductivity. The movable contact portion 33 includes a main body 33a, which extends in the radial direction of the contact holder 32, a pair of side portions 33b, which extend forward from both ends of the main body 33a, and a pair of bent portions 33c, which are bent radially outward from the front end of each side portion 33b.

The main body 33a has contact projections 33d projecting forward at two or more positions in the longitudinal direction. Each bent portion 33c includes a contact projection 33e projecting forward.

Most part of the rear surface of the main body 33a excluding the contact projections 33d are in contact with the top plate portion 32a of the contact holder 32. Each side portion 33b is engaged and in contact with the corresponding accommodating portion 32c. This engagement allows the movable contact portion 33 to be mounted to the contact holder 32 while positioning the movable contact portion 33. The contact projection 33e of each bent portion 33c is pressed against the corresponding mounting portion 21f of the bag holder 21 around the bulging portion 21h by the pressing piece 32d of the contact holder 32.

<Pin Holder 34>

The pin holder 34 is formed of a hard plastic having an insulation property. The main portion of the pin holder 34 is constituted by a substantially cylindrical tubular portion 34a having open front and rear ends. The tubular portion 34a is fitted to the shaft portion 31a of the pin 31 to be slidable in the front-rear direction.

The tubular portion 34a has an annular seat portion 34b in the intermediate portion in the front-rear direction on the outer circumferential portion. Specifically, the seat portion 34b is located at a position in front of the mounting hole 21g of the bag holder 21. The seat portion 34b protrudes outward in the radial direction of the tubular portion 34a from the outer circumferential portion of the tubular portion 34a. The seat portion 34b has a function of receiving the rear end of a coil spring 42, which will be discussed below. Further, the seat portion 34b is formed at a position that is located on the outer circumferential portion of the tubular portion 34a and immediately in front of a motion transmitting portion 35f, which will be discussed below. Further, the outer diameter of the seat portion 34b is set to be greater than the dimension required for receiving the rear end of the coil spring 42. Due to the settings relating to the formation position and outer diameter of the seat portion 34b, the seat portion 34b also serves as a motion receiving portion to which the forward motion of the damper holder 35 is transmitted through the motion transmitting portion 35f.

The tubular portion 34a includes an annular restricting portion 34c over the entire outer circumference at the rear end. The restricting portion 34c restricts the elastic member 36 from moving rearward with respect to the pin holder 34.

The tubular portion 34a includes an annular recess 34d having a uniform depth. The annular recess 34d is in the outer circumferential portion of the tubular portion 34a and located between the seat portion 34b and a position that is separated rearward from the receiving portion 34b by a certain distance. The deepest part of the annular recess 34d corresponds to a section of the tubular portion 34a of the pin holder 34 at which the outer diameter is reduced by the annular recess 34d. The outer diameter of this section is smaller than the inner diameter of an elastic body portion 36a of the elastic member 36.

At least the rear portion of the pin holder 34, which has the above described configuration, is covered from the rear by the contact holder 32.

<Damper Holder 35>

The damper holder 35 is formed of a hard plastic having an insulation property. The damper holder 35 is mounted to the airbag apparatus 20 while covering part of the pin holder 34. The main portion of the damper holder 35 is constituted by a bottom wall portion 35a and a cylindrical circumferential wall portion 35b extending rearward from the outer circumferential portion of the bottom wall portion 35a.

The inner circumferential portion of the bottom wall portion 35a is positioned behind the above-described seat portion 34b. Temporary joint portions for temporarily holding the damper holder 35 with respect to the corresponding cutout portions 21i of the bag holder 21 are formed on the front surface of the bottom wall portion 35a at two positions opposed to each other with the axis L3 in between. In the first embodiment, the temporary joint portions are constituted by temporary joint hooks 35c to be locked to the cutout portions 21i.

The circumferential wall portion 35b has an outer diameter greater than the outer diameter of the flange portion 31d of the pin 31.

Engaging hooks 35d are formed at a plurality of circumferentially separated positions of the circumferential wall portion 35b (see FIG. 5). These engaging hooks 35d are engaged with the engaging holes 32e of the contact holder 32 from inside, so that the damper holder 35 is mounted to the contact holder 32.

Stoppers 35e are formed at a plurality of positions on the outer circumferential portion of the front end of the circumferential wall portion 35b. The stoppers 35e are separated from the engaging hooks 35d in the circumferential direction. By engaging each stopper 35e with the corresponding cutout portion 32f of the contact holder 32, the damper holder 35 is positioned in the front-rear direction with respect to the contact holder 32 (see FIG. 2).

An annular motion transmitting portion 35f protrudes forward from the inner circumferential portion of the bottom wall portion 35a. The motion transmitting portion 35f constitutes part of the damper holder 35 and is inserted through the mounting hole 21g of the bag holder 21.

The most part of the damper holder 35, which has the above described configuration, is covered from the rear by the contact holder 32.

<Elastic Member 36>

The elastic member 36 has an annular elastic body portion 36a. In the first embodiment, the entire elastic member 36 is constituted by the elastic body portion 36a. The elastic member 36 is made of an elastic material such as rubber (for example, ethylene-propylene-diene copolymer rubber (EPDM), silicone rubber, or the like), elastomer, or the like.

The elastic body portion 36a is arranged in an annular space surrounded by the tubular portion 34a of the pin holder 34, the restricting portion 34c of the pin holder 34, the circumferential wall portion 35b of the damper holder 35, and the bottom wall portion 35a of the damper holder 35. The elastic body portion 36a is located rearward of the motion transmitting portion 35f and the annular recess 34d.

The inner circumferential surface of the elastic body portion 36a contacts the tubular portion 34a, and the outer circumferential surface of the elastic body portion 36a contacts the circumferential wall portion 35b. The front surface of the elastic body portion 36a contacts the bottom wall portion 35a, and part of the rear surface (an inner circumferential portion) of the elastic body portion 36a contacts the restricting portion 34c.

The elastic body portion 36a of the elastic member 36 is used as the spring of a dynamic damper. By adjusting the size (the measurements in the radial direction, the front-rear direction, and the like) of the elastic body portion 36a, the resonance frequency in the up-down direction or the left-right direction of the dynamic damper is set to a target frequency to be suppressed in the up-down direction or the left-right direction of the steering wheel 10, in other words, the desired frequency to be damped.

The entire elastic member 36, which has the above described configuration, is also covered from the rear by the contact holder 32.

<Noise Suppressing Portion 37 and Elastic Plate Portion 38>

The noise suppressing portion 37 is used to suppress generation of noise due to direct contact between the motion transmitting portion 35f of the damper holder 35 and the tubular portion 34a of the pin holder 34. The noise suppressing portion 37 is arranged at a position separated inward (radially inward) from the motion transmitting portion 35f. The space between the motion transmitting portion 35f and the noise suppressing portion 37 constitutes the gap G1. The noise suppressing portion 37 is made of a material softer than that of the pin holder 34. In the present embodiment, the noise suppressing portion 37 is made of the same material as that of the elastic member 36. The noise suppressing portion 37 is formed into an annular shape and is mounted by being fitted to the annular recess 34d of the pin holder 34. The noise suppressing portion 37 has an inner diameter that is substantially equal to the diameter of the deepest portion of the annular recess 34d and smaller than the inner diameter of the elastic body portion 36a. Further, the noise suppressing portion 37 has an outer diameter equal to the inner diameter of the elastic body portion 36a. In a state in which the noise suppressing portion 37 is mounted to the annular recess 34d, the outer circumferential surface of the noise suppressing portion 37 is positioned on the same plane as the inner circumferential surface of the elastic body portion 36a.

The elastic plate portion 38 is formed into a disk shape with a material softer than that of the seat portion 34b. In the present embodiment, the elastic plate portion 38 is made of the same soft material as that of the elastic member 36. The front end of the noise suppressing portion 37 is located between the gap G1 and the seat portion 34b. The elastic plate portion 38 is integrally formed on the outer circumference of the front end of the noise suppressing portion 37 and is located between the motion transmitting portion 35f and the seat portion 34b. The elastic plate portion 38 is in contact with both the motion transmitting portion 35f and the seat portion 34b. In other words, the motion transmitting portion 35f is indirectly in contact with the seat portion 34b via the elastic plate portion 38.

In the first embodiment, the noise suppressing portion 37 is integrally formed with and fixed to the annular recess 34d of the pin holder 34. The elastic plate portion 38 is integrally formed with and fixed to the seat portion 34b of the pin holder 34. Such integral formation is carried out, for example, by performing the insert molding, in which the pin holder 34 is placed in the mold as an insert member, and elastic material is injected to the space outside of the annular recess 34d of the pin holder 34 and the space behind the seat portion 34b.

<Support Assisting Member 41>

As shown in FIGS. 5, 6, and 7B, the support assisting member 41 is made of a hard plastic having an insulation property. Part of the support assisting member 41 is constituted by an annular plate-shaped seat portion 41a. The outer diameter of the seat portion 41a is set to be approximately equal to the diameter of the rear end on the inner wall surface of the through-hole 12a, that is, the maximum diameter on the tapered inner wall surface.

The seat portion 41a includes locking pieces 41b extending forward at positions separated apart from each other in the circumferential direction. A hook 41c projecting inward in the radial direction is formed on the front end of each locking piece 41b. The seat portion 41a includes engaging pieces 41d, each of which extends forward and is located between locking pieces 41b that are adjacent to each other in the circumferential direction. At least part of the outer surface of each engaging piece 41d constitutes part of a tapered surface of which the outer diameter decreases toward the front.

A pair of attachment portions 41e extends rearward from the seat portion 41a. Each attachment portion 41e is curved so as to bulge outward in the radial direction of the seat portion 41a to correspond to the outer shape of the shaft portion 31a of the pin 31.

The support assisting member 41 is fitted to the shaft portion 31a of the pin 31 at the seat portion 41a and the attachment portions 41e. Each of the hooks 41c enters the locking groove 31b, so that the support assisting member 41 is prevented from falling off the pin 31. As described above, in the support assisting member 41, the outer surfaces of the engaging pieces 41d are intermittently arranged in the circumferential direction with the locking pieces 41b arranged in between. With such a configuration, the support assisting member 41 as a whole has a tapered outer circumferential surface of which the outer diameter decreases toward the front.

<Urging Member>

The urging member is used to urge the airbag apparatus 20 rearward away from the steering wheel 10. The urging member is constituted by the coil spring 42 wound around the shaft portion 31a of the pin 31. The coil spring 42 is arranged in a compressed state between the seat portion 34b of the pin holder 34 and the seat portion 41a of the support assisting member 41.

As described above, the horn switch mechanism 30 is formed as an assembly in which independent components are unitized. Accordingly, when installed or replaced, the unitized horn switch mechanism 30 can be handled as an integral assembly.

When mounting each horn switch mechanism 30 to the bag holder 21, part (front part and intermediate part in the front-rear direction) of the horn switch mechanism 30 is inserted into the mounting hole 21g of the bag holder 21 from the rear as shown in FIG. 7A. The insertion is performed in a state in which the pair of temporary joint hooks 35c of the damper holder 35 are positioned behind the cutout portions 21i of the mounting hole 21g.

Figure 9:
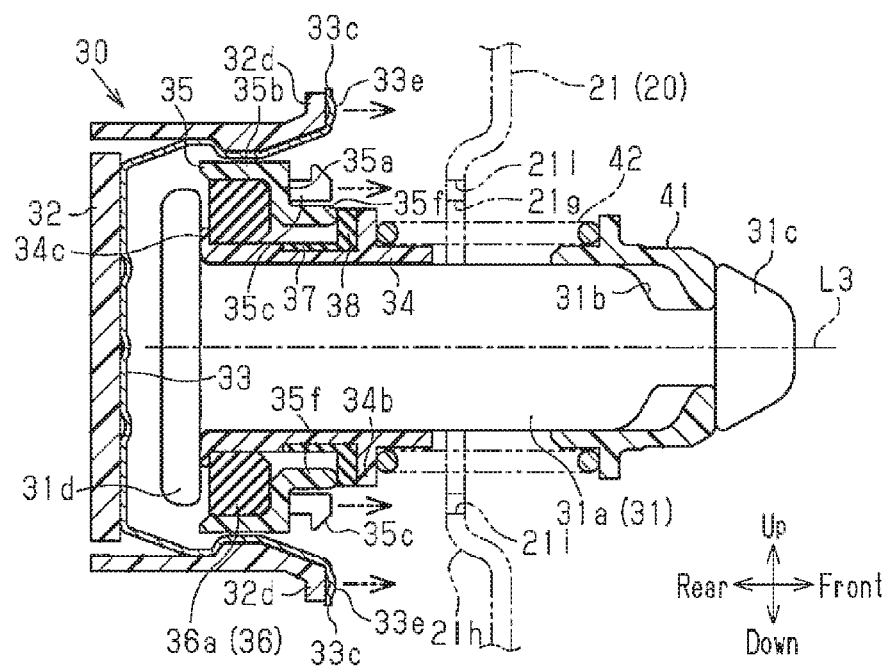
FIG. 9 is a cross-sectional side view showing the horn switch mechanism of the first embodiment when being assembled to the bag holder.

This insertion causes each temporary joint hook 35c to approach the corresponding cutout portion 21i as indicated by the arrows in FIG. 9. Further, the bent portions 33c, which include the contact projections 33e of the movable contact portion 33, and the pressing pieces 32d of the contact holder 32 approach parts of the bag holder 21 that are located about the bulging portion 21h.

The motion transmitting portion 35f and the temporary joint hooks 35c of the damper holder 35 are simultaneously inserted into the mounting hole 21g. When each of the temporary joint hooks 35c is passed through the corresponding cutout portion 21i, the temporary joint hook 35c contacts the inner wall of the cutout portion 21i, and the temporary joint hook 35c is moved elastically inward of the mounting hole 21g.

When the horn switch mechanism 30 is inserted to the position where the bottom wall portion 35a of the damper holder 35 contacts the bulging portion 21h of the bag holder 21, the temporary joint hook 35c passes the cutout portion 21i as shown in FIG. 8. The temporary joint hook 35c returns to the original shape by the elastic restoring force and is temporarily held by (temporarily fixed to) the bag holder 21 at the peripheral portion of the cutout portion 21i. Due to this temporary joint, the horn switch mechanism 30 is restrained from coming off the bag holder 21 and from rotating with respect to the bag holder 21.

At this time, the pressing pieces 32d of the contact holder 32 press the bent portions 33c of the movable contact portion 33 against the mounting portions 21f of the bag holder 21 around the bulging portion 21h. Accordingly, with the bent portions 33c elastically deformed, the contact projections 33e are brought into contact with the bag holder 21, so that the bag holder 21 and the movable contact portion 33 are held in a conductive state. Even if there are variations in the shapes and sizes of the movable contact portion 33 and the bag holder 21, such variations are absorbed by elastic deformation of the bent portions 33c. Therefore, the contact state between the movable contact portion 33 and the bag holder 21 is ensured.

As described with reference to FIG. 4, when the airbag apparatus 20 is assembled, the locking hooks 24d of the pad portion 24 are locked to the hook locking holes 21b of the bag holder 21, so that the pad portion 24 is mounted to the bag holder 21. As shown in FIG. 3, when the switch support portions 24f of the pad portion 24 contact the top plate portions 32a of the contact holders 32, each horn switch mechanism 30 is sandwiched between the pad portion 24 and the bag holder 21.

In this state, as shown in FIG. 6, the pin holder 34 supports the bag holder 21 to be slidable in the front-rear direction with respect to the pin 31, while preventing the pin 31 from contacting the bag holder 21, that is, while keeping the pin 31 and the bag holder 21 insulated from each other. Further, the pin holder 34 transmits the rearward urging force of the coil spring 42 to the pin 31 through the flange portion 31d.

Next, the operation of assembling the airbag apparatus 20 to the metal core 12 with the horn switch mechanisms 30 in between will be described.

In this operation, the pin 31 of each horn switch mechanism 30 is inserted from the rear into the through-hole 12a of the corresponding holding portion 12b of the metal core 12. With this insertion, the seat portion 41a of the support assisting member 41 approaches the holding portion 12b, and the engaging pieces 41d approach the inner wall surface of the through-hole 12a. The support portion 31c of the pin 31 contacts the clip 13. Further, when the pin 31 and the like are moved forward against the urging force of the clip 13, the clip 13 is elastically deformed outward in the radial direction of the pin 31. Then, when the pin 31 is moved to a position where the locking groove 31b faces the clip 13, the clip 13 acts to enter the locking groove 31b due to its own elastic restoring force.

On the other hand, the hooks 41c of the support assisting member 41, which is urged forward by the coil spring 42, enter the locking groove 31b. Therefore, in the process of entering the locking groove 31b, the clip 13 enters the space between the hooks 41c and the support portion 31c while compressing the coil spring 42 rearward. The entry of the clip 13 causes the hooks 41c to be located behind the clip 13 in the locking groove 31b. Part of the clip 13 that is forward of the through-hole 12a is sandwiched from the front and the back by the support portion 31c and the hooks 41c, which are urged forward by the coil spring 42. In this manner, when each clip 13 locks the pin 31 to the metal core 12, each horn switch mechanism 30 is fastened to the metal core 12, and the airbag apparatus 20 is mounted to the metal core 12. This structure, in which the pin 31 is locked to the metal core 12 by the elasticity of the clip 13 as the pin 31 is inserted into the through-hole 12a, is referred to as a snap-fit structure.

Operation and advantages of the first embodiment, which is configured as described above, will now be described for each situation.

When the airbag apparatus 20 is in a normal state, where the automobile is free from impact from front due to a frontal collision, gas is not ejected from the gas outlet 23e of the inflator 23, and the airbag remains folded.

<When Airbag Apparatus 20 is not Pushed Down>

As shown in FIGS. 5 and 6, when the airbag apparatus 20 is not pushed down in the normal state, the rearward urging force of the coil spring 42 is transmitted to the pin holder 34 at the seat portion 34b. The pin holder 34, which is urged rearward, is locked to the metal core 12 by the clip 13 and comes into contact with the flange portion 31d of the pin 31 so as to be restrained from further moving rearward.

Through the contact, the rearward urging force of the coil spring 42 is applied to the pin 31 via the flange portion 31*d*.

The urging force is transmitted to the bag holder 21 and the contact holder 32 via the damper holder 35. The urging force transmitted to the contact holder 32 is transmitted to the switch support portion 24*f*. The airbag apparatus 20, to which the urging force is transmitted in this manner, is moved rearward away from the steering wheel 10.

Along with this, the movable contact portion 33 mounted to the contact holder 32 is also urged rearward. The contact projections 33*d* are separated rearward from the fixed contact portion, which is constituted by the rear end of the pin 31. The movable contact portion 33 and the pin 31 are electrically disconnected from each other, and the horn device 45 does not operate.

Further, the forward urging force of the coil spring 42 is applied to the support assisting member 41 through the seat portion 41*a*. The hooks 41*c*, which have entered the locking groove 31*b* of the pin 31 in the support assisting member 41, push the clip 13 in the locking groove 31*b* forward. Due to this pushing, the clip 13 is sandwiched from the front and the back by the support portion 31*c* and the hooks 41*c* and restricted from moving.

At this time, the load of the airbag apparatus 20 is mainly transmitted to the pin holder 34 via the contact holder 32, the damper holder 35, and the elastic member 36.

Therefore, when vibrations in the up-down direction and the left-right direction are transmitted to the steering wheel 10 in the normal state during high-speed traveling of the automobile or idling of the automobile engine, the vibrations are transmitted to the airbag apparatus 20 via the metal core 12 and each horn switch mechanism 30. More specifically, the vibrations are transmitted to the contact holder 32 and the bag holder 21 via the pin 31, the pin holder 34, the elastic member 36, and the damper holder 35.

When the vibrations are transmitted in the above-described manner, the airbag apparatus 20 functions as the damper mass of a dynamic damper in response to the vibrations. The elastic body portion 36*a* of the elastic member 36 functions as the spring of a dynamic damper. Specifically, the elastic body portion 36*a* vibrates (resonates) in the up-down direction and the left-right direction together with the airbag apparatus 20, while being elastically deformed at the resonance frequency that is the same as or close to the target frequency of the vibration of the steering wheel 10. The resonance absorbs the vibration energy of the steering wheel 10 and suppresses (dampens) the vibration of the steering wheel 10.

Further, since the gap G1 exists between the tubular portion 34*a* of the pin holder 34 and the motion transmitting portion 35*f*, the elastic body portion 36*a* can enter the gap G1 when compressed and deformed in the radial direction. The elastic body portion 36*a* is more likely to be elastically deformed in the direction along the axis L3 as compared with a case in which the gap G1 is not provided. Thus, it is easy to vibrate the elastic body portion 36*a* together with the airbag apparatus 20, while elastically deforming the elastic body portion 36*a* at the target resonance frequency.

In addition, the motion transmitting portion 35*f* is unlikely to come into contact with the tubular portion 34*a* as compared with a case in which the gap G1 is not provided. This suppresses the occurrence of noise due to contacting actions.

Further, the noise suppressing portion 37, which is made of a material softer than that of the pin holder 34, restrains the motion transmitting portion 35*f* and the tubular portion 34*a* from directly contacting each other. The noise suppressing portion 37 is elastically deformed by contacting the motion transmitting portion 35*f*, thereby suppressing the generation of noise accompanying such contacting action.

Although having a small thickness, the elastic plate portion 38 is somewhat elastic. Thus, since the elastic plate portion 38 is arranged between the motion transmitting portion 35*f* and the seat portion 34*b*, the hard motion transmitting portion 35*f* and the hard seat portion 34*b* are prevented from directly contacting each other. That is, the generation of noise due to contact between the hard members is suppressed.

Furthermore, an annular gap G2 exists between the seat portion 34*b*, which projects from the outer circumferential surface of the pin holder 34, and the peripheral portion of the mounting hole 21*g* in the bag holder 21. Therefore, when the airbag apparatus 20 vibrates, interference between the seat portion 34*b* and the peripheral portion of the mounting hole 21*g* in the bag holder 21 is suppressed.

<When Airbag Apparatus 20 is Pushed Down>

Figure 11:
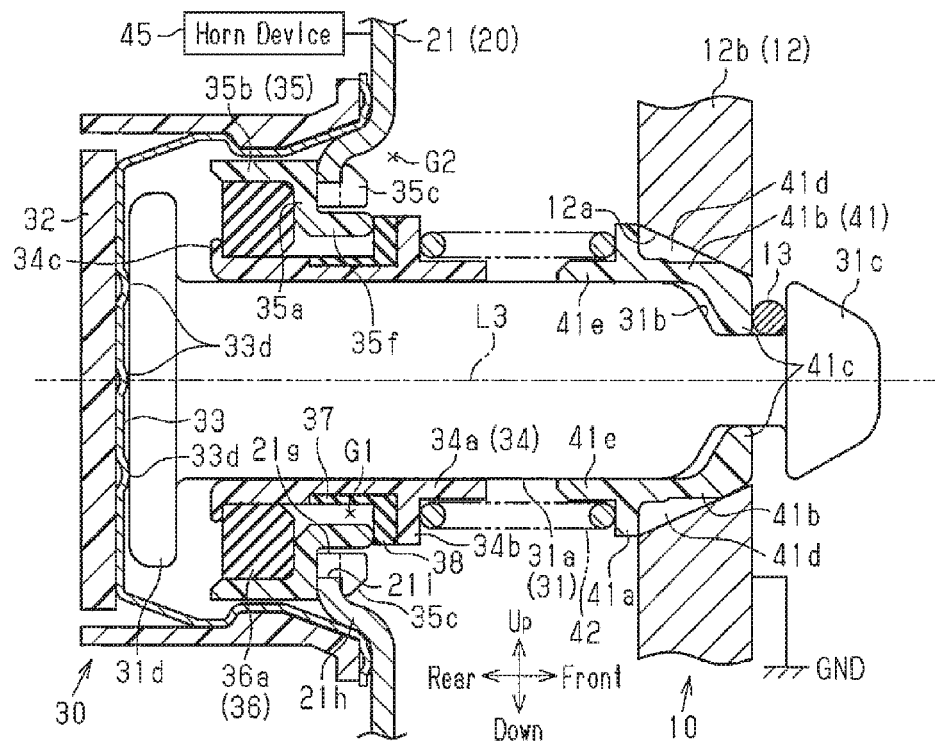
FIG. 11 is a partial cross-sectional side view showing the horn switch mechanism and its surroundings when the airbag apparatus is pushed down from the state shown in FIG. 6.

When the airbag apparatus 20 is pushed down to activate the horn device 45 in the normal state, the force applied to the airbag apparatus 20 is transmitted to the movable contact portion 33 and the damper holder 35 via the contact holder 32 of at least one of the horn switch mechanisms 30 as shown in FIG. 11. The damper holder 35, which includes the motion transmitting portion 35*f*, is pushed and moved forward. The forward motion of the motion transmitting portion 35*f* is indirectly transmitted to the seat portion 34*b*, which is located immediately in front of the motion transmitting portion 35*f*, via the elastic plate portion 38. In addition to the function of receiving the rearward urging force of the coil spring 42, the seat portion 34*b* also exerts the function of receiving a forward force transmitted from the damper holder 35 (the motion transmitting portion 35*f*).

Such transmission of force causes the pin holder 34 to slide forward on the shaft portion 31*a* of the pin 31 against the coil spring 42. Also, the movable contact portion 33 moves forward together with the contact holder 32. At this time, as the airbag apparatus 20 is pushed down, the coil spring 42 is compressed and the repulsive force increases. Therefore, the operation load increases and the operation feel becomes favorable.

As described above, when the elastic plate portion 38 is arranged between the motion transmitting portion 35*f* and the seat portion 34*b*, the forward motion of the motion transmitting portion 35*f* is indirectly transmitted to the seat portion 34*b* via the elastic plate portion 38, which is arranged forward of the gap G1. The elastic plate portion 38 is pushed forward by the motion transmitting portion 35*f* and elastically deformed. At this time, if the elastic plate portion 38 is elastically deformed to a large extent, the operation load is not increased as expected despite the airbag apparatus 20 being pushed down. This degrades the operation feel.

However, in the first embodiment, the elastic plate portion 38 is formed in a plate shape and has a small thickness. The amount of elastic deformation of the elastic plate portion 38 is thus small. Therefore, the elastic deformation of the elastic plate portion 38 has little influence on the operation feel when the airbag apparatus 20 is pushed down.

At this time, the rearward motion of the elastic member 36 relative to the pin holder 34 is restricted by the restricting portion 34*c* at the rear end of the pin holder 34. The elastic member 36 is held in a state of being arranged between the pin holder 34 and the damper holder 35. Therefore, when the airbag apparatus 20 is pushed down and the damper holder 35 and the pin holder 34 are moved forward, the elastic member 36 can be moved forward, following the damper holder 35 and the pin holder 34. This restrains the elastic member 36 from staying in the same position.

When at least one of the contact projections 33d of the movable contact portion 33 comes into contact with the rear end face of the pin 31, the bag holder 21 and the metal core 12, which is connected to the ground GND (automobile body grounding), are electrically connected to each other through the clip 13, the pin 31, and the movable contact portion 33. The electrical connection closes the circuit of the horn switch mechanism 30, so that the horn device 45, which is electrically connected to the bag holder 21, is activated.

<When Airbag Apparatus 20 Operates>

When an impact is applied to the automobile, for example, due to a frontal collision, the body of the driver acts to incline forward due to the inertia. Meanwhile, the inflator 23 of the airbag apparatus 20 is activated in response to the impact, so that gas is ejected from the gas outlet 23e. The gas is supplied to the airbag, deploying and inflating the airbag. When the pressing force applied to the outer cover 24a of the pad portion 24 is increased by the airbag, the outer cover 24a is ruptured at the thin portion 24c. The airbag continues to be deployed and inflated rearward through the opening formed by the rupture. The deployed and inflated airbag is located in front of the driver, whose body is acting to lean forward due to the impact of the frontal collision, and restrains the forward leaning movement of the driver to protect the driver from the impact.

When the airbag is inflated rearward, a rearward force is applied to the bag holder 21. On the other hand, the flange portion 31d at the rear end of each pin 31 is located rearward of the mounting hole 21g of the bag holder 21. The flange portion 31d has an outer diameter greater than the inner diameter of the mounting hole 21g. Thus, when the bag holder 21 moves rearward, the flange portion 31d functions as a stopper by being positioned behind the peripheral portion of the mounting hole 21g in the bag holder 21. Therefore, excessive rearward motion of the bag holder 21, which is accompanied by excessive rearward motion of the airbag apparatus 20, is reliably restricted by the flange portion 31d of the pin 31.

Figure 12:
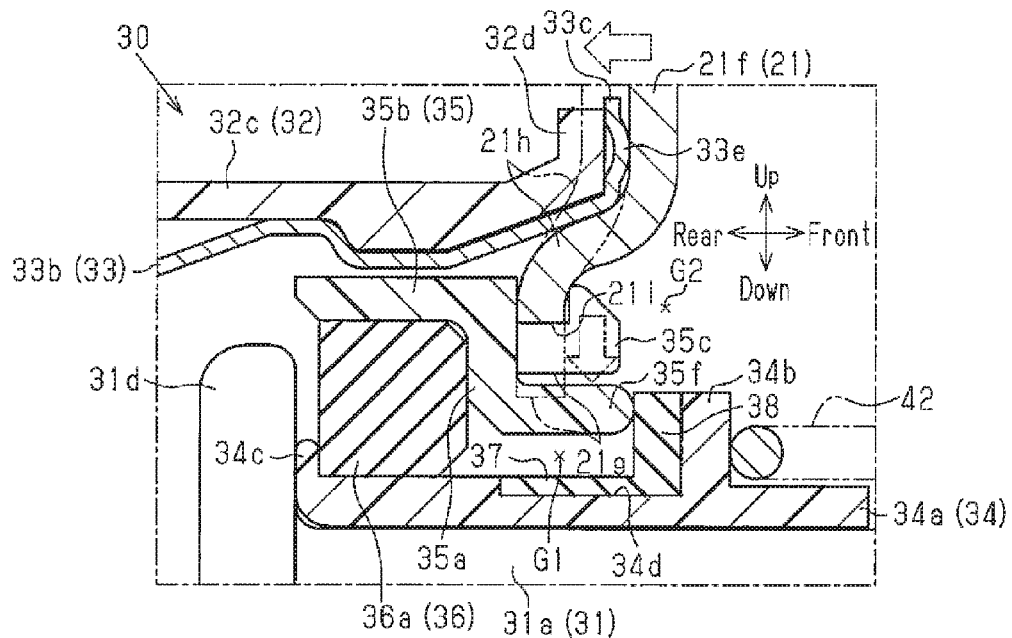
FIG. 12 is an explanatory partial cross-sectional side view corresponding to FIG. 8, illustrating a manner in which the inner diameter of the mounting hole is reduced by deformation of a bulging portion due to expansion of the airbag.

In particular, in the first embodiment, due to the stopper function of the flange portion 31d, the bulging portion 21h, which protrudes further rearward than the other portion in the bag holder 21, acts to be flattened as shown by the long dashed double-short dashed lines in FIG. 12. Along with this deformation, the mounting hole 21g is also deformed so that its inner diameter decreases as indicated by the arrow in FIG. 12. This enlarges the region where the flange portion 31d and the peripheral portion of the mounting hole 21g overlap, and thus enhances the performance of the flange portion 31d to restrict the rearward motion of the bag holder 21. As a result, it is possible to enhance the performance of preventing the bag holder 21 from coming off from the pin 31.

The noise suppressing portion 37 is positioned within the mounting hole 21g as with the case with the shaft portion 31a of the pin 31, the tubular portion 34a of the pin holder 34, the motion transmitting portion 35f of the damper holder 35, and the gap G1. Therefore, the noise suppressing portion 37 affects the inner diameter of the mounting hole 21g.

In the first embodiment, the inner diameter of the noise suppressing portion 37 is smaller than the inner diameter of the elastic body portion 36a. This allows the outer diameter of the noise suppressing portion 37 to be equal to the inner diameter of the elastic body portion 36a, while ensuring a sufficient thickness for suppressing noise. Thus, the inner diameter of the noise suppressing portion 37 can be made smaller than the inner diameter of the noise suppressing portion 56c (the inner diameter equal to the inner diameter of the elastic body portion 56a) in the conventional configuration disclosed in Japanese Laid-Open Patent Publication No. 2016-30552 (refer to FIG. 17), in which the noise suppressing portion 56c is arranged on the inner circumferential portion of the elastic body portion 56a. Further, the outer diameter of the noise suppressing portion 37 can be made smaller than the outer diameter of the noise suppressing portion 56c disclosed in Japanese Laid-Open Patent Publication No. 2016-30552.

Accordingly, as compared with the configuration of Japanese Laid-Open Patent Publication No. 2016-30552, in which the noise suppressing portion 56c has the same inner diameter as the inner diameter of the elastic body portion 56a, the outer circumferential surface of the noise suppressing portion 37, the gap G1 on the outer side of the noise suppressing portion 37, and the motion transmitting portion 35f are located close to the shaft portion 31a of the pin 31. As a result, the inner diameter of the mounting hole 21g can be reduced. The smaller the inner diameter of the mounting hole 21g, the greater becomes the difference between the inner diameter of the mounting hole 21g and the outer diameter of the flange portion 31d of the pin 31.

This enlarges the region where the flange portion 31d and the peripheral portion of the mounting hole 21g overlap as described above, and thus enhances the performance of the flange portion 31d to restrict the rearward motion of the bag holder 21. As a result, it is possible to enhance the performance of preventing the bag holder 21 from coming off from the pin 31.

The pin 31 of each horn switch mechanism 30 is mounted to the steering wheel 10 by being supported by the metal core 12 (the holding portion 12b). Therefore, when the airbag is inflated rearward, the pin 31 does not move rearward even if a rearward force is applied to the bag holder 21. In the bag holder 21, the peripheral portion of the opening 21d acts to be deformed to bulge rearward. During this deformation, each mounting portion 21f receives a force that acts to bend the mounting portion 21f along the corresponding first imaginary line LX (refer to FIG. 10), which passes through the corresponding mounting hole 21g.

It is now supposed that the pair of cutout portions 21i for each mounting hole 21g is located on the first imaginary line LX. In this case, if the mounting portion 21f is bent along the first imaginary line LX, the mounting hole 21g will largely expand from both cutout portions 21i. This may cause the pin 31 to come off the mounting hole 21g.

In this respect, in the first embodiment, a pair of cutout portions 21i for each mounting hole 21g is formed on the second imaginary line LA, which intersects with the first imaginary line LX. Thus, even if the mounting portion 21f is bent along the first imaginary line LX, the mounting hole 21g is unlikely to expand largely from the cutout portions 21i. Therefore, it is possible to prevent the pin 31 from coming off the mounting hole 21g. In particular, in the first embodiment, since the second imaginary line LA is orthogonal to the first imaginary line LX, the mounting hole 21g is unlikely to spread from the cutout portions 21i. This structure minimizes the possibility that the pin 31 will come off the mounting hole 21g.

<Regarding Size Reduction of Horn Switch Mechanism 30>

It is also conceivable that the airbag apparatus 20 is pulled upward by and toward the occupant so that a rearward force is applied to the airbag apparatus 20. The force is also transmitted to the damper holder 35. At this time, the pin holder 34 comes in contact with the flange portion 31d of the pin 31 and is thus restricted from moving rearward. Therefore, the damper holder 35 moves rearward while elastically deforming the elastic body portion 36a.

At this time, if the force is transmitted from the damper holder 35 to the elastic body portion 36a only at the rear end of the circumferential wall portion 55b as shown in FIG. 17, which is used in the description of Japanese Laid-Open Patent Publication No. 2016-30552, part of the elastic body portion 56a enters between the rear end of the circumferential wall portion 55b and the flange portion 53b as the airbag apparatus 20 is pulled upward in the above-described manner. The entered part may affect the vibration damping performance. In order to solve this problem, it is conceivable to increase the outer diameter of the flange portion 53b to reduce the gap between the flange portion 53b and the rear end of the circumferential wall portion 55b. This solution, however, involves a trade-off. That is, the support structure may be enlarged. This is because, when the outer diameter of the flange portion 53b is increased, it is necessary to increase the outer diameter of the contact holder 58, which covers the pin 53 from the rear, so as to ensure a radial gap with the flange portion 53b. As a result, the radial dimension of the support structure increases.

In this respect, in the first embodiment, as shown in FIG. 8, the force is transmitted from the damper holder 35 to the elastic body portion 36a in the bottom wall portion 35a, which is located inside the circumferential wall portion 35b. In addition, the region related to this force transmission is wider than when the force is transmitted only at the rear end of the circumferential wall portion 55b of FIG. 17. Thus, part of the elastic body portion 36a is unlikely to enter between the rear end of the circumferential wall portion 35b and the flange portion 31d. As a result, the vibration damping performance is unlikely to be affected by excessive rearward motion of the damper holder 35.

Since it is unnecessary to increase the outer diameter of the flange portion 31d, the size in the radial direction of the horn switch mechanism 30 is reduced. As a result, it is possible to reduce the size of the structure in which the airbag apparatus 20 is supported by the steering wheel 10.

As each horn switch mechanism 30 is miniaturized, the horn switch mechanisms 30 can be brought close to each other, so that the space required for mounting the airbag apparatus 20 is reduced. This allows the size of the airbag apparatus 20 to be easily reduced. It is thus possible to deal with cases where the size of the airbag apparatus 20 is desired to be reduced.

<Other Features>

When the above-described pulling up action applies a rearward force to the airbag apparatus 20, the force is received by the bottom wall portion 35a. Thus, it is possible to increase the inner diameter of the circumferential wall portion 35b to reduce the thickness of the circumferential wall portion 35b as compared with the conventional configuration disclosed in Japanese Laid-Open Patent Publication No. 2016-30552 (see FIG. 17), in which the force is received by the rear end of the circumferential wall portion 55b. Accordingly, the outer diameter of the elastic body portion 36a can be increased to increase the difference between the outer diameter of the elastic body portion 36a and the inner diameter of the elastic body portion 36a, that is, the thickness of the elastic body portion 36a. This facilitates the setting of the frequency band in which vibrations are dampened.

Second Embodiment

A structure for supporting an airbag apparatus 20 according to a second embodiment will now be described with reference to FIGS. 13 to 16.

If the entire gap G1 in the first embodiment is filled with elastic material, the repulsive force generated by the elastic material filling the gap G1 is added to the repulsive force generated by the elastic deformation of the elastic body portion 36a. As a result, the elastic body portion 36a becomes less likely to be elastically deformed. This may affect and destabilize the frequency characteristics of the vibration suppressed by the elastic body portion 36a.

In contrast, if the annular gap G1 is provided as in the first embodiment, the repulsive force that would be generated by elastic material in the gap G1 is not added to the repulsive force generated by elastic deformation of the elastic body portion 36a. Thus, elastic deformation of the elastic body portion 36a is not hampered by such elastic material. The elastic body portion 36a is elastically deformed and easily vibrates with the airbag apparatus 20, so that vibrations in the intended direction (up-down direction or left-right direction) of the steering wheel 10 are easily suppressed.

Figure 13:
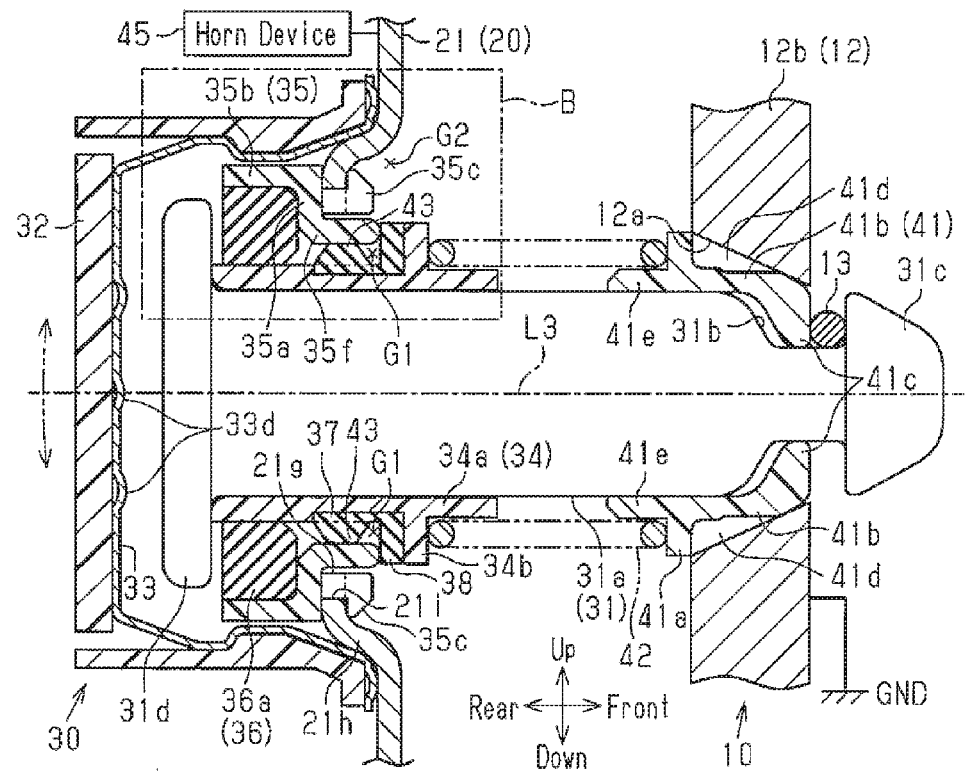
FIG. 13 is a partial cross-sectional side view showing a horn switch mechanism and its surroundings when an airbag apparatus according to a second embodiment is not pushed down.

On the other hand, as indicated by the arrows of the long dashed double-short dashed lines in FIG. 13, the airbag apparatus 20 may swing about the elastic member 36. In this case, the frequency characteristics of the vibration may be unstable due to the influence of the swinging motion.

Figure 14:
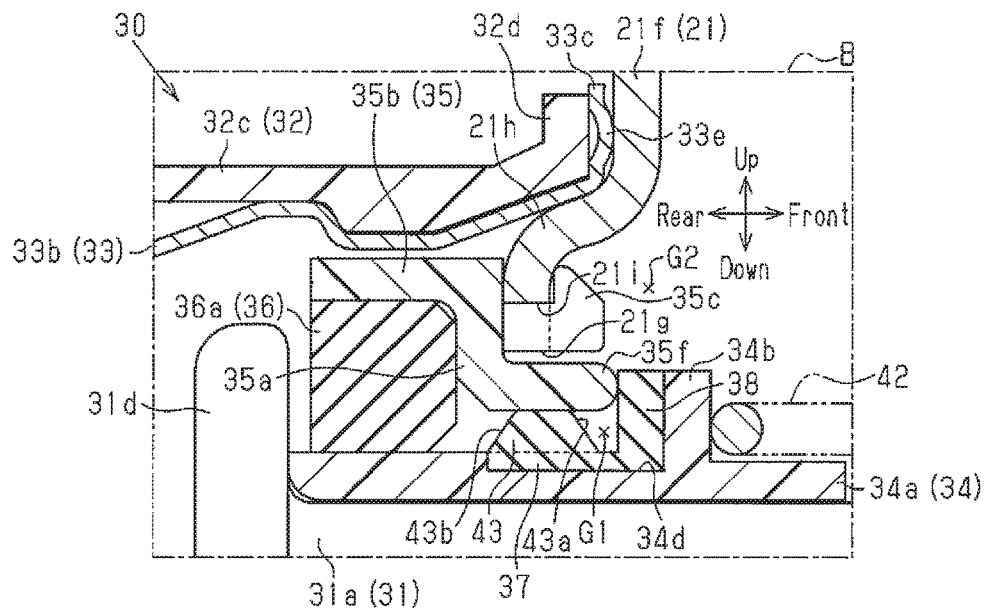
FIG. 14 is an enlarged partial cross-sectional side view illustrating section B in FIG. 13.
Figure 15A:
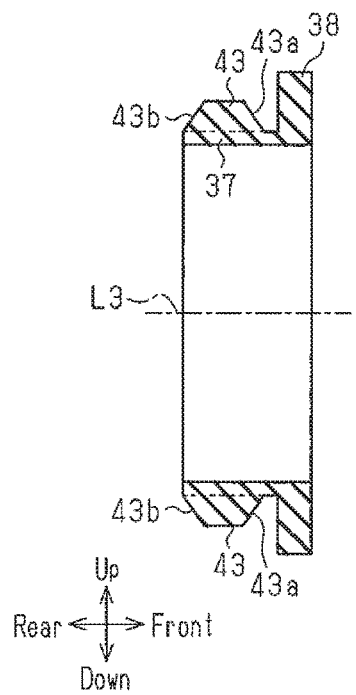
FIG. 15A is a cross-sectional side view of ribs and the surroundings of the second embodiment.
Figure 15B:
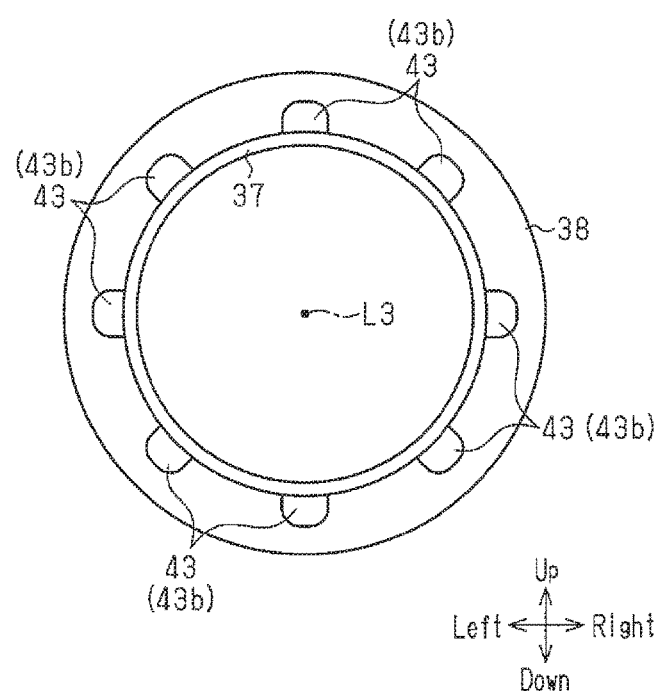
FIG. 15B is a front view of the ribs and the surroundings of the second embodiment.
Figure 16:
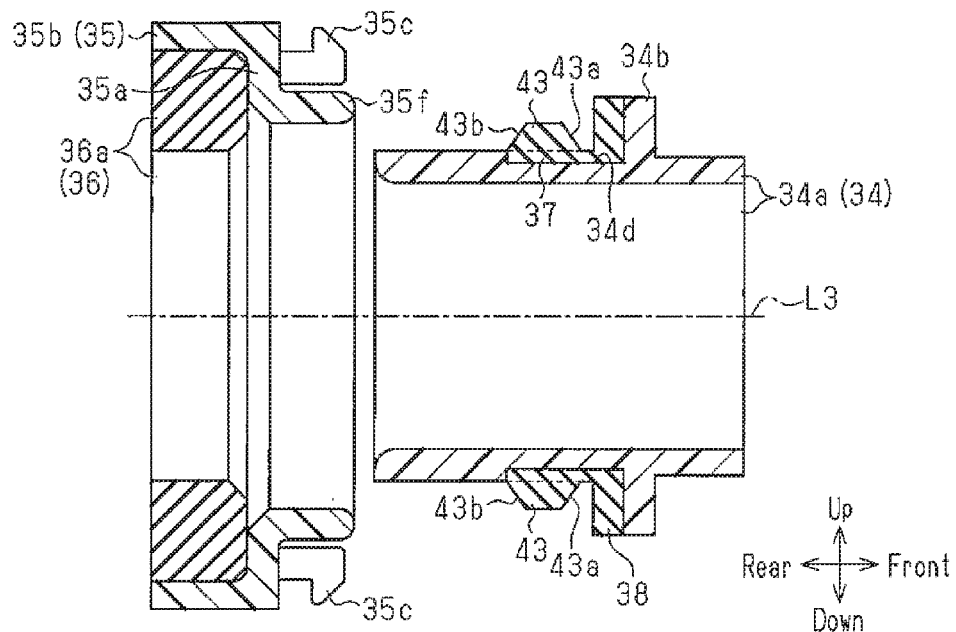

In this respect, the second embodiment includes ribs 43 at positions separated from each other in the circumferential direction of the gap G1 as shown in FIGS. 13 and 14, in addition to the configuration of the first embodiment. Each rib 43 has elasticity and occupies the corresponding position in the gap G1. The ribs 43 are formed integrally with the noise suppressing portion 37 and made of the same material as that of the noise suppressing portion 37. As shown in FIGS. 15A and 15B, in the present embodiment, eight ribs 43 are formed on the outer circumferential surface of the noise suppressing portion 37 at equal angular intervals about the axis L3. Each rib 43 is located at a position opposed to another rib 43 with the axis L3 in between.

A front end face 43a of each rib 43 is separated rearward from the elastic plate portion 38. The front end face 43a of each rib 43 is inclined with respect to the axis L3 of the pin 31 so as to be closer to the noise suppressing portion 37 toward the front side. In contrast, a rear end face 43b of each rib 43 is inclined with respect to the axis L3 so as to be closer to the noise suppressing portion 37 toward the rear side. That is, the front end face 43a and the rear end face 43b of each rib 43 are inclined in opposite directions. In each rib 43, the angle formed by the rear end face 43b and the axis L3 and the angle formed by the front end face 43a and the axis L3 may be equal to or different from each other.

As shown in FIG. 14, the outer circumferential surface of each rib 43 is in surface contact with or close to the inner circumferential surface of the motion transmitting portion 35f of the damper holder 35.

The second embodiment does not include the restricting portion 34c at the rear end of the tubular portion 34a of the pin holder 34.

Other than the differences described above, the second embodiment is the same as the first embodiment. Thus, like or the same reference numerals are given to those components that are like or the same as the corresponding components described above in the first embodiment and detailed explanations are omitted.

The second embodiment is the same as the first embodiment except that a plurality of ribs 43 is provided. The second embodiment thus basically operates in the same manner as and achieves the same advantages as the first embodiment.

In addition, in the second embodiment, the ribs 43 filling the gap G1 are separated from each other in the circumferential direction of the gap G1. Thus, compared to the case where the entire gap G1 is filled with the ribs 43, an increase in the repulsive force that would accompany additional ribs 43 is reduced. The extent to which the elastic body portion 36*a* resists elastic deformation due to the additional ribs 43 is reduced. As a result, it is possible to stabilize the frequency characteristic of the vibration suppressed by the elastic body portion 36*a*.

In addition, since the ribs 43 are provided, the airbag apparatus 20 is restricted from swinging in the direction indicated by the long dashed double-short dashed line in FIG. 13 about the elastic body portion 36*a*. The influence of the swinging motion of the airbag apparatus 20 on the frequency characteristic of the vibration is reduced. As a result, the frequency characteristics of the vibration are stabilized as compared with the case where the gap G1 is entirely filled or not filled at all.

Particularly, each rib 43 is positioned at a position opposed to another rib 43 with the axis L3 in between. Thus, the function of restricting the swinging motion of the airbag apparatus 20 about the elastic member 36 and the function of suppressing the increase of the repulsive force accompanying additional ribs 43 are exerted in a well-balanced manner at positions opposed to each other with the axis L3 in between, that is, on both sides in the vibration direction.

Further, since the ribs 43 (eight ribs 43) are arranged at equal angular intervals around the axis L3, the above-described effect of stabilizing the frequency characteristics of the vibration can be achieved irrespective of the position of the noise suppressing portion 37 and the pin holder 34 in the circumferential direction.

In addition, when part of each rib 43 is compressed in the up-down direction or the left-right direction and elastically deformed, it tends to be elastically deformed to bulge forward. If the ribs 43 are connected to the elastic plate portion 38 positioned on the front side of the ribs 43, this elastic plate portion 38 acts to hinder the forward elastic deformation of the ribs 43.

However, in the second embodiment, the ribs 43 are separated rearward from the elastic plate portion 38. Due to the gap between each rib 43 and the elastic plate portion 38, the rib 43 is easily elastically deformed forward. Therefore, it is possible to reduce the influence of each rib 43 on the frequency characteristics of the vibration suppressed by the elastic body portion 36*a*.

In addition, each rib 43 is formed in the noise suppressing portion 37, which is a member independent from the elastic member 36. The rib 43 and the elastic member 36 are not influenced by the material of the other. This adds to the degree of freedom in selecting the material of the ribs 43 and the elastic member 36. That is, the ribs 43 can be formed using an elastic material having a hardness satisfying the performance required for the ribs 43. Also, the elastic member 36 can be formed using an elastic material having a hardness satisfying the performance required for the elastic member 36.

Further, in the second embodiment, all the ribs 43 are formed together with the noise suppressing portion 37 when the noise suppressing portion 37 is formed. If the ribs 43 and the noise suppressing portion 37 are formed separately, it is necessary to fix the ribs 43 to the noise suppressing portion 37 after forming the ribs 43 and the noise suppressing portion 37. However, the second embodiment requires no operation for fixing the ribs 43 to the noise suppressing portion 37.

Further, the rear end face 43*b* of each rib 43 is inclined with respect to the axis L3 so as to be closer to the noise suppressing portion 37 toward the rear side. Therefore, as compared with the case where the rear end face 43*b* of each rib 43 is orthogonal to the axis L 3, each rib 43 is small. This reduces the rigidity of each rib 43 and thus reduces the repulsive force of each rib 43, which is added to the repulsive force generated by the elastic deformation of the elastic body portion 36*a*. As compared with the case where the rear end face 43*b* of each rib 43 is orthogonal to the axis L 3, the elastic body portion 36*a* is more likely to be elastically deformed. This stabilizes the frequency characteristics of the vibration.

Further, the front end face 43*a* of each rib 43 is inclined with respect to the axis L3 so as to be closer to the noise suppressing portion 37 toward the front side. Therefore, as compared with the case where the front end face 43*a* of each rib 43 is orthogonal to the axis L 3, each rib 43 is small. This reduces the rigidity of each rib 43 and thus reduces the repulsive force of each rib 43, which is added to the repulsive force generated by the elastic deformation of the elastic body portion 36*a*. As compared with the case where the front end face 43*a* of each rib 43 is orthogonal to the axis L 3, the elastic body portion 36*a* is more likely to be elastically deformed. This stabilizes the frequency characteristics of the vibration.

In order to arrange the noise suppressing portion 37 inside the motion transmitting portion 35*f* as shown in FIG. 13, the pin holder 34, to which the noise suppressing portion 37 is mounted, is inserted into the damper holder 35, to which the elastic member 36 is mounted, from the rear end of the pin holder 34. In this case, each rib 43 may interfere with the motion transmitting portion 35*f*.

In this respect, since the rear end face 43*b* of each rib 43 is inclined as described above in the second embodiment, the protrusion amount of the rear end of each rib 43 from the noise suppressing portion 37 is minimized at the rear edge of the rib 43 and increases toward the front side. The rear ends of the ribs 43 are unlikely to interfere with the front end of the motion transmitting portion 35*f*. Therefore, the rear end of each rib 43 is easily inserted into the motion transmitting portion 35*f*, facilitating the assembly.

The above-described embodiments may be modified as follows.

<Regarding Bag Holder 21>

In FIG. 10, the cutout portions 21*i* of each mounting hole 21*g* may be formed on a second imaginary line LA that intersects with the first imaginary line LX at an angle other than 90°.

<Regarding Pin Holder 34>

The motion receiving portion of the tubular portion 34*a* of the pin holder 34 may be provided at a location different from the seat portion 34*b*.

The motion receiving portion (the seat portion 34*b*) may be integrally formed with the tubular portion 34*a*, but may be formed as an independent member.

The restricting portion 34*c* may be modified to have a configuration different from that in the first embodiment as long as it is provided at the rear end of the tubular portion 34*a* of the pin holder 34 and restricts the elastic member 36 from moving rearward with respect to the pin holder 34. For example, a plurality of restricting portions 34*c* may be provided on the rear end of the tubular portion 34a at positions separated from each other in the circumferential direction.

The second embodiment may include the restricting portion 34c.

<Regarding Damper Holder 35>

The motion transmitting portion 35f does not necessarily have to be annular. A plurality of arcuate motion transmitting portions 35f each extending along the circle centered on the axis L3 of the pin 31 may be provided at several positions on that circle.

<Regarding Elastic Member 36>

The elastic member 36 may have a shape different from that in the above-illustrated embodiments. The elastic member 36 may include a component in addition to the elastic body portion 36a.

<Regarding Noise Suppressing Portion 37 and Elastic Plate Portion 38>

Unlike the above-illustrated embodiments, the noise suppressing portion 37 and the elastic plate portion 38 may be formed as members independent from the pin holder 34 and mounted to the annular recess 34d.

The elastic plate portion 38 does not necessarily have to be annular.

The elastic plate portion 38 may be omitted. In this case, the motion transmitting portion 35f of the damper holder 35 is in direct contact with the seat portion 34b of the pin holder 34.

The outer diameter of the noise suppressing portion 37 may be smaller or greater than the inner diameter of the elastic body portion 36a as long as the inner diameter of the noise suppressing portion 37 is smaller than the inner diameter of the elastic body portion 36a.

<Regarding Urging Member>

As an urging member, a spring of a different kind from the coil spring 42 or an elastic body different from a spring may be used as long as the urging member urges the airbag apparatus 20 rearward and away from the steering wheel 10.

<Regarding Ribs 43>

The front end of each rib 43 may be connected to the elastic plate portion 38.

At least one of the front end face 43a and the rear end face 43b of each rib 43 may be orthogonal to the axis L3 of the pin 31.

The ribs 43 may be provided in the motion transmitting portion 35f of the damper holder 35 instead of the noise suppressing portion 37. In this case, the ribs 43 are provided so as to project radially inward from the inner wall surface of the motion transmitting portion 35f.

Some of the ribs 43 may be provided in the noise suppressing portion 37, and the remaining ribs 43 may be provided in the motion transmitting portion 35f of the damper holder 35.

The number of the ribs 43 may be changed as long as it is greater than one.

The shape of each rib 43 may be changed to a shape different from that of the second embodiment.

For example, the shape of each rib 43 may be changed to a shape that makes line contact or point contact with the inner circumferential surface of the motion transmitting portion 35f of the damper holder 35 instead of the shape that makes surface contact.

An even number other than eight of the ribs 43 may be provided, and the ribs 43 may be arranged such that each rib 43 is opposed to another rib 43 with the axis L3 of the pin 31 in between.

In this case also, the function of restricting the swinging motion of the airbag apparatus 20 about the elastic member 36 and the function of suppressing the increase of the repulsive force accompanying additional ribs 43 are exerted in a well-balanced manner at positions opposed to each other with the axis L3 in between, that is, on both sides in the vibration direction.

The ribs 43 may be provided at four or greater even number of positions around the axis L3 of the pin 31 at equal angular intervals.

In this case, when the steering wheel vibrates, the restricting portions, which satisfy the above described conditions and the number of which is four or greater, exert the function of restricting swinging action of the airbag apparatus about the elastic member and the function of suppressing increase in the repulsive force accompanying additional ribs. The effect of stabilizing the frequency characteristics of the vibration is obtained irrespective of the position in the circumferential direction at which the elastic member is installed.

<Additional Modification>

The steering wheel to which the support structure for an airbag apparatus is applied may be the steering wheel of the steering apparatus in a vehicle other than an automobile, for example, an aircraft, a ship, or the like.

The invention claimed is:

1. A support structure for an airbag apparatus, comprising:
    an airbag apparatus that functions as a damper mass of a dynamic damper and includes a bag holder;
    a pin including
        a shaft portion that extends in a front-rear direction and is passed through a mounting hole provided in the bag holder, and
        a flange portion that is formed at a rear end of the shaft portion and is unable to be passed through the mounting hole,
        wherein the pin is mounted to a steering wheel at a front end of the shaft portion and supports the airbag apparatus at a rear portion of the shaft portion;
    a pin holder that slidably covers the shaft portion while being passed through the mounting hole;
    a damper holder that is mounted to the airbag apparatus while covering the pin holder;
    an elastic member including an annular elastic body portion that is arranged between the pin holder and the damper holder and functions as a spring of the dynamic damper;
    a motion transmitting portion that is provided in an inner circumferential portion of the damper holder and passed through the mounting hole; and
    a motion receiving portion that protrudes from an outer circumferential surface of the pin holder, wherein
    a forward motion of the damper holder is transmitted to the pin holder at least via the motion transmitting portion and the motion receiving portion,
    a gap is provided inside the motion transmitting portion,
    the support structure further comprises a noise suppressing portion that is located between the gap and the pin holder, and
    the noise suppressing portion is made of a material softer than the pin holder and has an inner diameter smaller than an inner diameter of the elastic body portion.

2. The support structure for an airbag apparatus according to claim 1, wherein
    the motion transmitting portion is arranged forward of the elastic body portion, a recess is formed in an outer circumferential portion of the pin holder, the recess being located forward of the elastic body portion, and the noise suppressing portion is mounted by being fitted in the recess.

3. The support structure for an airbag apparatus according to claim 1, further comprising an elastic plate portion that is made of a material softer than the motion receiving portion, wherein the elastic plate portion is arranged forward of the gap and between the motion transmitting portion and the motion receiving portion.

4. The support structure for an airbag apparatus according to claim 1, wherein
the damper holder includes
a bottom wall portion that is arranged forward of the elastic body portion while being in contact with a front surface of the elastic body portion, and
a circumferential wall portion that extends rearward from an outer circumferential portion of the bottom wall portion and surrounds the elastic body portion, and
the motion transmitting portion constitutes part of the damper holder and projects forward from an inner circumferential portion of the bottom wall portion.

5. The support structure for an airbag apparatus according to claim 1, wherein a restricting portion is provided at a rear end of the pin holder, and the restricting portion restricts the elastic member from moving rearward relative to the pin holder.

6. The support structure for an airbag apparatus according to claim 1, wherein
the bag holder includes a temporary receiving portion, and
the damper holder includes a temporary joint portion that temporarily holds the damper holder with respect to the temporary receiving portion.

7. The support structure for an airbag apparatus according to claim 6, wherein
the bag holder is configured to be bent along a first imaginary line, which passes through the mounting hole, when the airbag apparatus is activated,
the temporary receiving portion is one of a pair of temporary receiving portions,
the temporary receiving portions are constituted by two cutout portions that are provided on an inner wall surface of the mounting hole at two positions opposed to each other with an axis of the mounting hole in between,
the temporary joint portion is one of a pair of temporary joint portions,
the temporary joint portions are respectively locked to the cutout portions, and
the cutout portions are provided on a second imaginary line, which intersects with the first imaginary line.

8. The support structure for an airbag apparatus according to claim 1, wherein
a peripheral portion of the mounting hole in the bag holder bulges rearward with respect to remaining portions of the bag holder, and
the mounting hole is located rearward of the motion receiving portion.

9. The support structure for an airbag apparatus according to claim 1, further comprising:
an urging member that urges the airbag apparatus rearward and away from the steering wheel;
a fixed contact portion that is constituted by a rear end of the pin; and
a movable contact portion that is mounted to the airbag apparatus, wherein
when the airbag apparatus is not pushed down, the movable contact portion is separated rearward from the fixed contact portion, and
when the airbag apparatus is pushed down, the movable contact portion contacts the fixed contact portion to activate a horn device.

10. The support structure for an airbag apparatus according to claim 9, further comprising a contact holder, wherein
the contact holder covers, from rear, the pin, the pin holder, the elastic member, and the damper holder,
the movable contact portion is mounted to the contact holder,
the movable contact portion is made of band-shaped spring steel having conductivity, and
opposite ends of the movable contact portion are pressed against the bag holder by the contact holder about the mounting hole.

11. The support structure for an airbag apparatus according to claim 1, further comprising a plurality of ribs provided at a plurality of positions separated from each other in a circumferential direction of the gap,
wherein each rib has elasticity and occupies the corresponding position in the gap.

12. The support structure for an airbag apparatus according to claim 11, wherein each rib is provided in at least one of the noise suppressing portion and the motion transmitting portion.

13. The support structure for an airbag apparatus according to claim 12, wherein each rib is integrally formed with the noise suppressing portion.

14. The support structure for an airbag apparatus according to claim 13, wherein a rear end face of each rib is inclined with respect to an axis of the pin so as to be closer to the noise suppressing portion toward a rear side.

15. The support structure for an airbag apparatus according to claim 13, wherein a front end face of each rib is inclined with respect to an axis of the pin so as to be closer to the noise suppressing portion toward a front side.

16. The support structure for an airbag apparatus according to claim 11, wherein
the ribs are an even number of ribs, and
each rib is located at a position opposed to another rib with an axis of the pin in between.

17. The support structure for an airbag apparatus according to claim 11, wherein
the ribs are provided at four or greater even number of positions around an axis of the pin, and
the ribs are arranged at equal angular intervals.

18. The support structure for an airbag apparatus according to claim 1, wherein the pin is mounted to the steering wheel at the front end of the shaft portion by a snap-fit structure.

* * * * *